United States Patent
Zhou

(10) Patent No.: US 9,783,185 B2
(45) Date of Patent: Oct. 10, 2017

(54) VEHICLE PROPULSION SYSTEM HAVING AN ENERGY STORAGE SYSTEM AND OPTIMIZED METHOD OF CONTROLLING OPERATION THEREOF

(71) Applicant: General Electric Company, Schenectady, NY (US)

(72) Inventor: Zhi Zhou, Selkirk, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 14/479,937

(22) Filed: Sep. 8, 2014

(65) Prior Publication Data

US 2016/0052505 A1    Feb. 25, 2016

Related U.S. Application Data

(63) Continuation-in-part of application No. 14/462,765, filed on Aug. 19, 2014, and a continuation-in-part of application No. 14/462,792, filed on Aug. 19, 2014.

(51) Int. Cl.
*B60W 20/00* (2016.01)
*B60W 10/08* (2006.01)
(Continued)

(52) U.S. Cl.
CPC .............. *B60W 20/10* (2013.01); *B60L 7/14* (2013.01); *B60L 11/002* (2013.01); *B60L 11/14* (2013.01);
(Continued)

(58) Field of Classification Search
CPC ...... B60W 20/10; B60W 20/00; B60W 10/08; B60W 10/06; B60W 10/02; B60W 10/26;
(Continued)

(56) References Cited

U.S. PATENT DOCUMENTS 5,218,283 A    6/1993  Wills et al.
6,044,922 A    4/2000  Field
(Continued)

FOREIGN PATENT DOCUMENTS

| EP | 2556988 A2 | 2/2013 |
| EP | 2733008 A1 | 5/2014 |
| EP | 2738908 A1 | 6/2014 |

OTHER PUBLICATIONS

Williamson et al., "Comprehensive Drive Train Efficiency Analysis of Hybrid Electric and Fuel Cell Vehicles Based on Motor-Controller Efficiency Modeling," IEEE Transactions on Power Electronics, vol. 21, No. 3, May 2006, pp. 730-740.
(Continued)

*Primary Examiner* — Mussa A Shaawat
*Assistant Examiner* — Abdhesh Jha
(74) *Attorney, Agent, or Firm* — Meagher Emanuel Laks Goldberg & Liao, LLP

(57) ABSTRACT

A vehicle propulsion system includes a plurality of power sources coupled to a final drive of the vehicle propulsion system. A controller is programmed to determine a desired power demand from the power sources and operate a number of the power sources to produce the desired power demand. The controller identifies a least efficient power source of the power sources and controls the least efficient power source to produce power at an optimum operating point of the least efficient power source. The controller also identifies a power output of the least efficient power source corresponding to the optimum operating point, compares the power output of the least efficient power source to the desired power demand, identifies a remaining power demand from the comparison, and controls another power source to produce the remaining power demand.

18 Claims, 10 Drawing Sheets

(51) Int. Cl.

| | | |
|---|---|---|
| *B60W 10/06* | (2006.01) | |
| *B60W 20/10* | (2016.01) | |
| *B60L 7/14* | (2006.01) | |
| *B60L 11/00* | (2006.01) | |
| *B60L 11/14* | (2006.01) | |
| *B60L 11/16* | (2006.01) | |
| *B60L 11/18* | (2006.01) | |
| *B60L 15/00* | (2006.01) | |
| *B60L 15/20* | (2006.01) | |
| *B60W 10/26* | (2006.01) | |
| *B60W 20/19* | (2016.01) | |

(52) U.S. Cl.
CPC .......... *B60L 11/16* (2013.01); *B60L 11/1803* (2013.01); *B60L 11/1853* (2013.01); *B60L 11/1857* (2013.01); *B60L 11/1861* (2013.01); *B60L 11/1864* (2013.01); *B60L 11/1868* (2013.01); *B60L 15/007* (2013.01); *B60L 15/2045* (2013.01); *B60W 10/06* (2013.01); *B60W 10/08* (2013.01); *B60W 10/26* (2013.01); *B60W 20/19* (2016.01); *B60L 2210/12* (2013.01); *B60L 2210/14* (2013.01); *B60L 2210/40* (2013.01); *B60L 2240/421* (2013.01); *B60L 2240/423* (2013.01); *B60L 2240/427* (2013.01); *B60L 2240/527* (2013.01); *B60L 2240/547* (2013.01); *B60L 2260/42* (2013.01); *B60L 2260/54* (2013.01); *B60W 2510/0666* (2013.01); *B60W 2510/085* (2013.01); *B60W 2510/244* (2013.01); *B60W 2710/0677* (2013.01); *B60W 2710/086* (2013.01); *B60W 2710/242* (2013.01); *Y02T 10/645* (2013.01); *Y02T 10/70* (2013.01); *Y02T 10/7005* (2013.01); *Y02T 10/7044* (2013.01); *Y02T 10/7061* (2013.01); *Y02T 10/7066* (2013.01); *Y02T 10/7077* (2013.01); *Y02T 10/7225* (2013.01); *Y02T 10/7233* (2013.01); *Y02T 10/7241* (2013.01); *Y02T 10/7283* (2013.01); *Y10S 903/93* (2013.01)

(58) Field of Classification Search
CPC .. B60W 20/40; B60W 20/20; B60W 30/1882; B60W 10/30; B60W 20/14
USPC ... 701/22, 110, 113, 36, 101, 102, 103, 112, 701/123, 32.1, 33.7, 34.2, 67, 70
See application file for complete search history.

(56) References Cited

U.S. PATENT DOCUMENTS

| | | | |
|---|---|---|---|
| 6,592,484 B1* | 7/2003 | Tsai | B60K 6/365 |
| | | | 475/5 |
| 7,075,306 B2 | 7/2006 | Emori et al. | |
| 7,259,533 B2 | 8/2007 | Yang et al. | |
| 7,308,958 B2 | 12/2007 | Tamor et al. | |
| 7,701,156 B2 | 4/2010 | Okamura | |
| 8,024,082 B2 | 9/2011 | Richter et al. | |
| 8,086,364 B2 | 12/2011 | Xue et al. | |
| 8,359,124 B2 | 1/2013 | Zhou et al. | |
| 8,370,007 B2 | 2/2013 | Brooks et al. | |
| 8,525,468 B2 | 9/2013 | Winterhalter et al. | |
| 8,626,368 B2 | 1/2014 | Hendrickson et al. | |
| 8,994,327 B2 | 3/2015 | Kusch et al. | |
| 2004/0020697 A1* | 2/2004 | Field | B60K 6/40 |
| | | | 180/65.23 |
| 2005/0040789 A1 | 2/2005 | Salasoo et al. | |
| 2007/0158118 A1 | 7/2007 | King | |
| 2010/0222953 A1 | 9/2010 | Tang | |
| 2011/0011659 A1 | 1/2011 | Sailor et al. | |
| 2012/0041625 A1* | 2/2012 | Kelty | B60L 11/1862 |
| | | | 701/22 |
| 2012/0130891 A1 | 5/2012 | Bogaard et al. | |
| 2012/0200256 A1 | 8/2012 | Tse | |
| 2013/0016537 A1 | 1/2013 | Deng | |
| 2013/0138279 A1 | 5/2013 | Shi et al. | |
| 2013/0147404 A1 | 6/2013 | Kim et al. | |
| 2013/0218383 A1* | 8/2013 | Martin | B60K 6/46 |
| | | | 701/22 |
| 2013/0234664 A1 | 9/2013 | Marus et al. | |
| 2013/0328393 A1 | 12/2013 | Bullock | |
| 2014/0077737 A1 | 3/2014 | Zhang et al. | |
| 2014/0145850 A1 | 5/2014 | Houle et al. | |
| 2014/0266038 A1 | 9/2014 | Gibeau et al. | |
| 2015/0266386 A1 | 9/2015 | Matsuda et al. | |

OTHER PUBLICATIONS

U.S. Appl. No. 14/480,002, filed Sep. 8, 2014, Zhi Zhou.
U.S. Appl. No. 14/462,765, filed Aug. 19, 2014, Zhi Zhou.
U.S. Appl. No. 14/462,792, filed Aug. 19, 2014, Jian Zhou.
Non-Final Rejection towards corresponding U.S. Appl. No. 14/480,002 dated Dec. 31, 2015.
European Search Report and Written Opinion issued in connection with related EP Application No. 15181274.0-1807 dated Jan. 8, 2016.
European Search Report and Written Opinion issued in connection with related EP Application No. 15181296.3-1807 dated Jan. 8, 2016.
US Non-Final Rejection issued in connection with related U.S. Appl. No. 14/462,792 on Oct. 23, 2015.
US Non-Final Rejection issued in connection with related U.S. Appl. No. 14/462,765 on Nov. 16, 2015.
US Final Office Action issued in connection with related U.S. Appl. No. 14/480,002 on Apr. 15, 2016.
US Final Office Action issued in connection with related U.S. Appl. 14/462,765 on Apr. 7, 2016.

* cited by examiner

VEHICLE PROPULSION SYSTEM HAVING AN ENERGY STORAGE SYSTEM AND OPTIMIZED METHOD OF CONTROLLING OPERATION THEREOF

CROSS-REFERENCE TO RELATED APPLICATION

The present application is a continuation-in-part of, and claims priority to, U.S. non-provisional application Ser. No. 14/462,765, filed Aug. 19, 2014, and U.S. non-provisional application Ser. No. 14/462,792, filed Aug. 19, 2014, the disclosures of which are incorporated herein by reference in their entirety.

BACKGROUND OF THE INVENTION

Embodiments of the invention relate generally to electric drive systems for hybrid and electric vehicles and, more particularly, to a vehicle propulsion system for hybrid and electric vehicles with one or more energy storage devices and one or more electromechanical devices and an optimized method of controlling operation of the vehicle propulsion system.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration, with one or both the first and second sources being capable of being charged through regenerative braking.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

While propulsion system configurations for purely electric vehicles and hybrid electric vehicles have been developed to include multiple sources of electrical energy to increase energy or power density and multiple power sources to achieve desired propulsive output, incorporating these energy storage and power sources into a propulsion system increases the overall size, weight, and cost of the system. For example, to ensure a minimum level of performance will be maintained over the desired life of the vehicle, batteries are often oversized to reduce power and cyclic stresses. Also, overly aggressive thermal management controls are implemented to help reduce thermal stresses on the batteries. Both of these approaches increase the overall vehicle size, increase manufacturing costs, and increase the operating costs of the energy storage system.

Traditional energy storage units for hybrid and electric vehicles are designed and implemented with little control over the degradation rate of the energy storage units or batteries within the system. Known battery life prognosis is performed off-line using physics-based models to predict the rate of various individual degradation mechanisms. These experimental models may take into account solid-electrolyte interphase (SEI) resistance growth and capacity fade, chemical reaction paths for SEI growth, the onset of particle fracture due to high-rate charge/discharge, or the electrochemical state for a single duty-cycle of a battery. To date, however, known models do not predict the post-initiation crack propagation needed to correlate actual capacity fade with the experimental data and lack the predictive capability for arbitrary battery duty-cycles.

Further, the off-line life testing of battery technologies is typically performed in an accelerated manner that condenses many cycles into a much shorter period of time than the battery would experience during normal operation. As such, the empirical models developed using accelerated aging testing may not accurately account for the interactions between the calendar-related and cycling-related response of the battery in a real-time, real-world application.

In addition to the operation of energy storage units, the system efficiency of hybrid and electric power systems is also affected by the DC link voltage of the drive system. One known technique for determining the DC link voltage uses a comprehensive model to calculate a DC bus voltage that minimizes motor and inverter loss for a particular vehicle propulsion system configuration. Use of such a comprehensive model is time intensive and results in expensive hardware deployment. Moreover, such a method relies on the model's accuracy and is inevitably not robust to varying system components and operational modes. Another technique for determining a DC link voltage uses a motor system efficiency map to search for a voltage level with minimal loss. As this technique relies on a direct look-up table, noise on all input appears on the output voltage command. Moreover, the look-up table is static and does not take system dynamics into account. Thus, a sudden load change may cause unsatisfactory responsive performance on motor torque due to the latency of the voltage command. The comprehensive model likewise fails to respond satisfactorily to sudden load changes, typically adding a predetermined margin to the voltage command to accommodate any dynamic uncertainly. However, such a predetermined margin often produces an unsatisfactory response; since too large of a margin sacrifices system efficiency while too small of a margin will not meet the requested dynamic response.

As outlined above, known techniques for configuring a hybrid or electric propulsion system to operate with multiple energy storage sources and one or more power sources rely on experimentally determined models and static data that does not account for real-time, real-world system dynamics and operating conditions. Accordingly, use of these known techniques reduces the operating efficiency and fuel economy of the individual components of the propulsion system in addition to reducing the overall system efficiency.

Therefore, it would be desirable to provide an electric and/or hybrid electric propulsion system that improves overall system efficiency and optimizes the operation and lifespan of the energy storage units and operating efficiency, while permitting the propulsion system to be manufactured at a reduced cost.

BRIEF DESCRIPTION OF THE INVENTION

According to one aspect of the invention, a vehicle propulsion system includes a plurality of power sources coupled to a final drive of the vehicle propulsion system. A controller is programmed to determine a desired power demand from the plurality of power sources and operate a number of the plurality of power sources to produce the desired power demand. Operating the number of the plurality of power sources includes identifying a least efficient power source of the plurality of power sources, controlling the least efficient power source to produce power at an optimum operating point of the least efficient power source, and identifying a power output of the least efficient power source corresponding to the optimum operating point. Operating the number of the plurality of power sources further includes comparing the power output of the least efficient power source to the desired power demand, identifying a remaining power demand from the comparison, and controlling another power source of the plurality of power sources to produce the remaining power demand.

In accordance with another aspect of the invention, a method of powering a propulsion system of a hybrid electric vehicle includes the steps of determining a power demand of the hybrid electric vehicle, identifying operating efficiencies of a plurality of power sources coupled to a final drive of the hybrid electric vehicle, and identifying a least efficient power source of the plurality of power sources. The method also includes controlling the least efficient power source to operate at a maximum operating efficiency of the least efficient power source, determining a power output of the least efficient power source when operating at the maximum operating efficiency, comparing the power output of the least efficient power source to the total power demand, and controlling another power source of the plurality of power sources to output power to the final drive if the power output of the least efficient power source is less than the total power demand.

In accordance with yet another aspect of the invention, a control system for a vehicle propulsion system comprising an internal combustion engine (ICE) and an electric powertrain is disclosed. The control system includes a controller programmed to determine a desired power demand from the vehicle propulsion system, identify an ICE power output corresponding to an optimum operating point of the ICE, and compare the ICE power output to the desired power demand. If the ICE power output exceeds the desired power demand, the controller supplies a first subportion of the ICE power output to a final drive of the vehicle propulsion system and supplies a second subportion of the ICE power output to at least one energy storage unit of the electric powertrain to recharge the at least one energy storage unit. If the ICE power output does not exceed the desired power demand, the controller supplies the ICE power output to the final drive.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
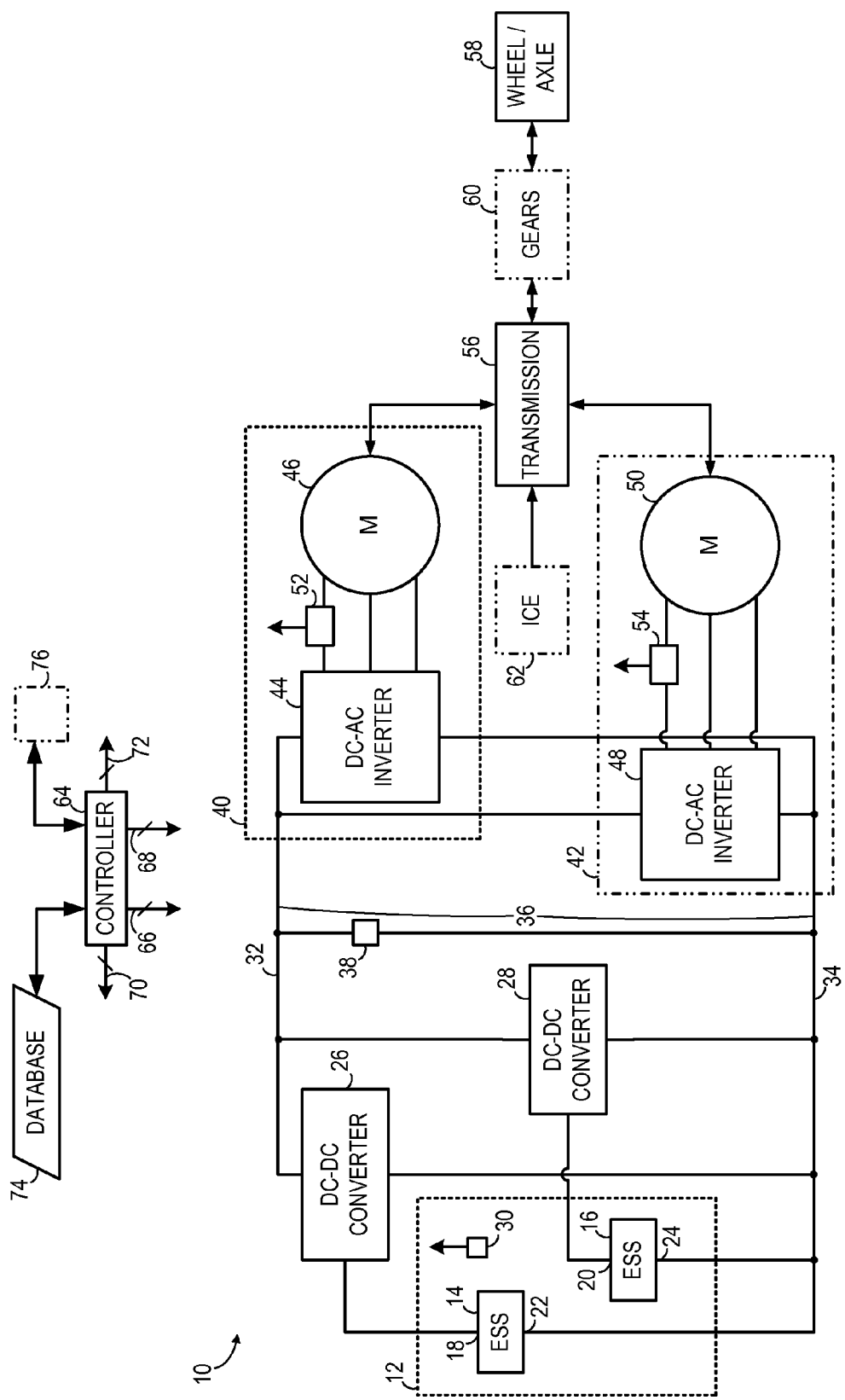
FIG. 1 is a schematic diagram of a vehicle propulsion system according to an embodiment of the invention.

FIG. 1 is a schematic diagram of a propulsion system 10 according to an embodiment of the invention. As described in detail below, propulsion system 10 may be configured in a pure electric (EV) propulsion system arrangement that splits power output between one or more electromechanical devices or as a hybrid (HEV) propulsion system that includes an internal combustion engine in addition to one or more electromechanical devices. In either an EV or HEV embodiment, the electromechanical devices are provided on a common DC bus or on an output port of independent channels of a multi-channel DC-DC converter, simplifying the electrical DC bus and cabling structure and saving cost while still permitting flexibility in the sizing and operation of the multiple electromechanical devices and increasing the operating efficiency of the electromechanical devices and overall propulsion system.

According to various embodiments, propulsion system 10 is configured to be incorporated into various types of vehicles including, but not limited to, automobiles, busses, trucks, tractors, commercial and industrial vehicles such as mining and construction equipment, marine craft, aircrafts and off-road vehicles, including material transport vehicles or personal carrier vehicles, capable of operation both on the surface and underground such as in mining operations, or other type of electrical apparatus such as, for example, a crane, elevator, or lift, as non-limiting examples.

Propulsion system 10 includes an energy storage system 12 having a first energy storage unit 14 and a second energy storage unit 16. Each energy storage unit 14, 16 have a positive terminal 18, 20 and a negative terminal 22, 24. Positive terminal 18 of first energy storage unit 14 is coupled to a first bi-directional DC-DC converter 26 and positive terminal 20 of second energy storage unit 16 is coupled to a second bi-directional DC-DC converter 28. Each of the first and second energy storage units 14, 16 has a separate or integrated energy storage management system (not shown), which may be configured as a battery management system (BMS) in an embodiment the respective energy storage unit is a battery. According to another embodiment, bi-directional DC-DC converters 26, 28 are bi-directional DC-DC voltage converters or bi-directional buck/boost voltage converters.

A sensor system 30 is provided within propulsion system 10 to monitor and calculate the state-of-charge (SOC) of the first and second energy storage units 14, 16. According to one embodiment, sensor system 30 includes voltage sensors and/or current sensors configured to measure the voltage and/or current of first and second energy storage units 14, 16 at various times during operation thereof.

According to various embodiments, first and second energy storage units 14, 16 each include one or more energy storage devices such as a battery, a flywheel, fuel cell, an ultracapacitor, or a combination of ultracapacitors, fuel cells, and/or batteries, as examples. In one embodiment, first energy storage unit 14 is a high specific-power energy storage device and second energy storage unit 16 is a high specific-energy storage device. For example, first energy storage unit 14 may be an ultracapacitor having multiple capacitor cells coupled to one another, where the capacitor cells may each have a capacitance that is greater than approximately 500 Farads. Alternatively, first energy storage unit 14 may be a high power battery having a specific-power of approximately 350 W/kg or greater or a combination of one or more ultracapacitors and batteries. In such an embodiment, second energy storage unit 16 has a relatively low specific power as compared with first energy storage unit 14. As used herein, low specific power describes an energy storage device demonstrated to achieve a specific power on the order of approximately 200 W/kg or lower. According to various embodiments, second energy storage unit 16 may be, for example, a high specific energy battery or high energy density battery. The term energy battery used herein describes a high specific energy battery demonstrated to achieve a specific energy on the order of 100 W-hr/kg or greater (e.g., a Li-ion, sodium-metal halide, sodium nickel chloride, sodium-sulfur, Li-Air, or zinc-air battery).

In one embodiment, second energy storage unit 16 has a relatively high resistivity and impedance as compared with first energy storage unit 14. In another embodiment, the relatively low specific power of second energy storage unit 16 may be due to an imbalance of the individual battery cells comprising the energy storage system. In one embodiment, second energy storage unit 16 is a low-cost lithium ion battery. Alternatively, second energy storage unit 16 may be a sodium metal halide battery, a sodium sulfur battery, a nickel metal hydride battery, a Zinc-air battery, a lead acid battery, and the like.

Propulsion system 10 also includes a first bi-directional DC-DC converter 26 and second bi-directional DC-DC converter 28 are coupled across the positive DC link 32 and the negative DC link 34 of a DC bus 36. A voltage sensor 38 is coupled across DC bus 36 to monitor a DC bus voltage. In another embodiment, sensor 38 is embedded in one of the DC-DC converters.

According to one embodiment, either or both of first and second energy storage units 14, 16 may be sized such that the respective bi-directional DC-DC converters 26, 28 may be omitted, resulting in a propulsion system 10 that includes fewer parts and less weight than a system that includes a respective DC-DC voltage converter for each energy storage system. In such an embodiment, a contactor (not shown) may be provided to selectively couple the respective energy storage unit to the DC bus.

Both first bi-directional DC-DC converter 26 and second bi-directional DC-DC converter 28, when used, are configured to convert one DC voltage to another DC voltage either by bucking or boosting the DC voltage. According to one embodiment, each bi-directional DC-DC converter 26, 28 includes an inductor coupled to a pair of electronic switches and coupled to a pair of diodes. Each switch is coupled to a respective diode, and each switch/diode pair forms a respective half phase module. Switches may be, for example, insulated gate bipolar transistors (IGBTs), metal oxide semiconductor field effect transistors (MOSFETs), silicon carbide (SiC) MOSFETs, Gallium nitride (GaN) devices, bipolar junction transistors (BJTs), and metal oxide semiconductor controlled thyristors (MCTs).

First and second energy storage units 14, 16 are coupled via DC bus 36 to a first load 40 and an optional second load 42 (shown in phantom). In one embodiment, first and second loads 40, 42 are electric drives. First load 40 includes a first DC-to-AC voltage inverter 44 and a first motor or first electromechanical device 46. Second load 42 includes a second DC-to-AC voltage inverter 48 and a second motor or second electromechanical device 50. In one embodiment, each inverter 44, 48 includes six half phase modules that are paired to form three phases, with each phase is coupled between the positive and negative DC links 32, 34 of the DC bus 36.

Each electromechanical device 46, 50 includes a plurality of windings coupled to respective phases of its respective DC-to-AC voltage inverter 44, 48. In one embodiment, electromechanical device 46 is a traction motor and electromechanical device 50 is either an alternator or a traction motor. In another embodiment, electromechanical devices 46, 50 are AC motors. Sensor assemblies, generally indicated as part numbers 52 and 54 in FIG. 1, include various current and/or voltage sensors to monitor torque and speed of the respective electromechanical devices 46, 50.

Although the propulsion system 10 is described herein as including three-phase inverters 44, 48 and three-phase electromechanical devices 46, 50, it is contemplated that propulsion system 10 may utilize any number of phases in alternative embodiments.

Propulsion system 10 also includes a transmission 56 coupled to the outputs of first and second electromechanical devices 46, 50. Transmission 56 is constructed as a gear assembly, belt assembly, or combination thereof according to various embodiments. According to one embodiment, transmission 56 is configured as an electrically variable transmission (EVT) that couples the outputs of electromechanical devices 46, 50 through an arrangement of internal planetary gears and clutches (not shown). In operation, electromechanical devices 46, 50 may be operated over a wide range of bi-directional speed, torque, and power commands to minimize power loss and maintain a high degree of overall system efficiency while propulsion system 10 is operating in either a charge depleting (CD) or charge sustaining (CS) mode of operation.

The output of transmission 56 is coupled to one or more driving wheels 58 or axles of a vehicle through a gear assembly 60, which may include a differential. Depending on how the clutches of transmission 56 are configured, first or second electromechanical device 46, 50 may be coupled to gear assembly 60 through transmission 56 or may be directly coupled to gear assembly 60 such that the output of first or second electromechanical device 46, 50 bypasses transmission 56.

According to one embodiment propulsion system 10 is configured as a pure electric vehicle (EV) propulsion system. Alternatively, propulsion system 10 is configured in a hybrid electric vehicle (HEV) propulsion system and also includes an internal combustion engine (ICE) 62 (shown in phantom) coupled to transmission 56. According to various embodiments, internal combustion engine 62 may be an internal combustion gasoline engine, an internal combustion diesel engine, an internal combustion engine fueled by natural gas, an external combustion engine, or a gas turbine engine, as non-limiting examples.

Propulsion system 10 also includes a controller 64 operably coupled to first and second bi-directional DC-DC converters 26, 28 by control lines 66. Through appropriate control of the switches of first bi-directional DC-DC converter 26, controller 64 is configured to boost a voltage of first energy storage unit 14 to a higher voltage and to supply the higher voltage to the DC bus 36. Likewise, controller 64 is configured to control switching of second bi-directional DC-DC voltage converter 28 to boost the voltage of energy storage unit 16 to a higher voltage and to supply the higher voltage to the DC bus 36 during a motoring mode of operation. Controller 64 is also configured to control switching of first and second bi-directional DC-DC converters 26, 28 to buck a voltage of DC bus 36 and to supply the bucked voltage to the respective first or second energy storage unit 14, 16 during a charging or regenerative mode of operation. In one embodiment control lines 66 include a real or virtual communication data link that conveys the voltage commands to the respective bi-directional DC-DC converter 26, 28.

Controller 64 is also coupled to first DC-to-AC voltage inverter 44 and second DC-to-AC voltage inverter 48 through control lines 68. In a motoring mode, controller 64 is configured to control the half phase modules of first and second DC-to-AC voltage inverters 44, 48 to convert the DC voltage or current on DC bus 36 to an AC voltage or current for supply to the electromechanical devices 46, 50. When accelerating in the motoring mode, propulsion system 10 increases the speed of rotation of one or both of electromechanical devices 46, 50 from zero or from its real-time or current speed to a higher speed. In a regenerative mode, controller 64 is configured to control first and second DC-to-AC voltage inverters 44, 48 to invert an AC voltage or current received from its corresponding electromechanical device 46, 50 into a DC voltage or current to supply to DC bus 36.

During operation controller 64 also receives feedback from voltage sensor 38 via control lines 70 and from energy storage unit sensor system 30 via control lines 72. As one skilled in the art will recognize, additional voltage and/or current sensors may be provided throughout propulsion system 10 to permit controller 64 to monitor other operating conditions. In addition, one skilled in the art will recognize that controller 64 may receive feedback from and/or transmit control commands to other components within propulsion system 10, such as, for example, internal combustion engine 62.

While the energy storage system 12 of propulsion system 10 is described herein as including two energy storage units, it is contemplated that alternative embodiments may include a single energy storage unit coupled to a single DC-DC voltage converter assembly or three or more energy storage units either directly coupled to DC bus 36 or coupled to DC bus 36 via one of first and second bi-directional DC-DC converter 26, 28 or an additional DC-DC converter. In addition, alternative embodiments may include a single electromechanical device/DC-to-AC voltage inverter pair coupled to DC bus 36 or three or more electromechanical devices coupled to DC bus 36 via respective DC-to-AC voltage inverters.

According to one embodiment, propulsion system 10 includes a database 74 configured to store information related to the propulsion system 10. Such information may include, as examples, degradation models for energy storage units 14, 16, predefined voltage scheduling maps for the electromechanical devices 46, 50, and historical or known acceleration and deceleration periods of the vehicle along a known route or according to vehicle acceleration/deceleration trends or a predefined duty cycle. An optional vehicle position sensor 76 (shown in phantom) may be provided to determine a position of the vehicle along a route based on position identifiers such as mile markers, time of day, or global positioning system (GPS) location information, for example, with the vehicle position information being related to acceleration and deceleration events stored in database 74. Each acceleration and deceleration event in database 74 may also contain information regarding the time duration of an acceleration or deceleration event.

Figure 2:
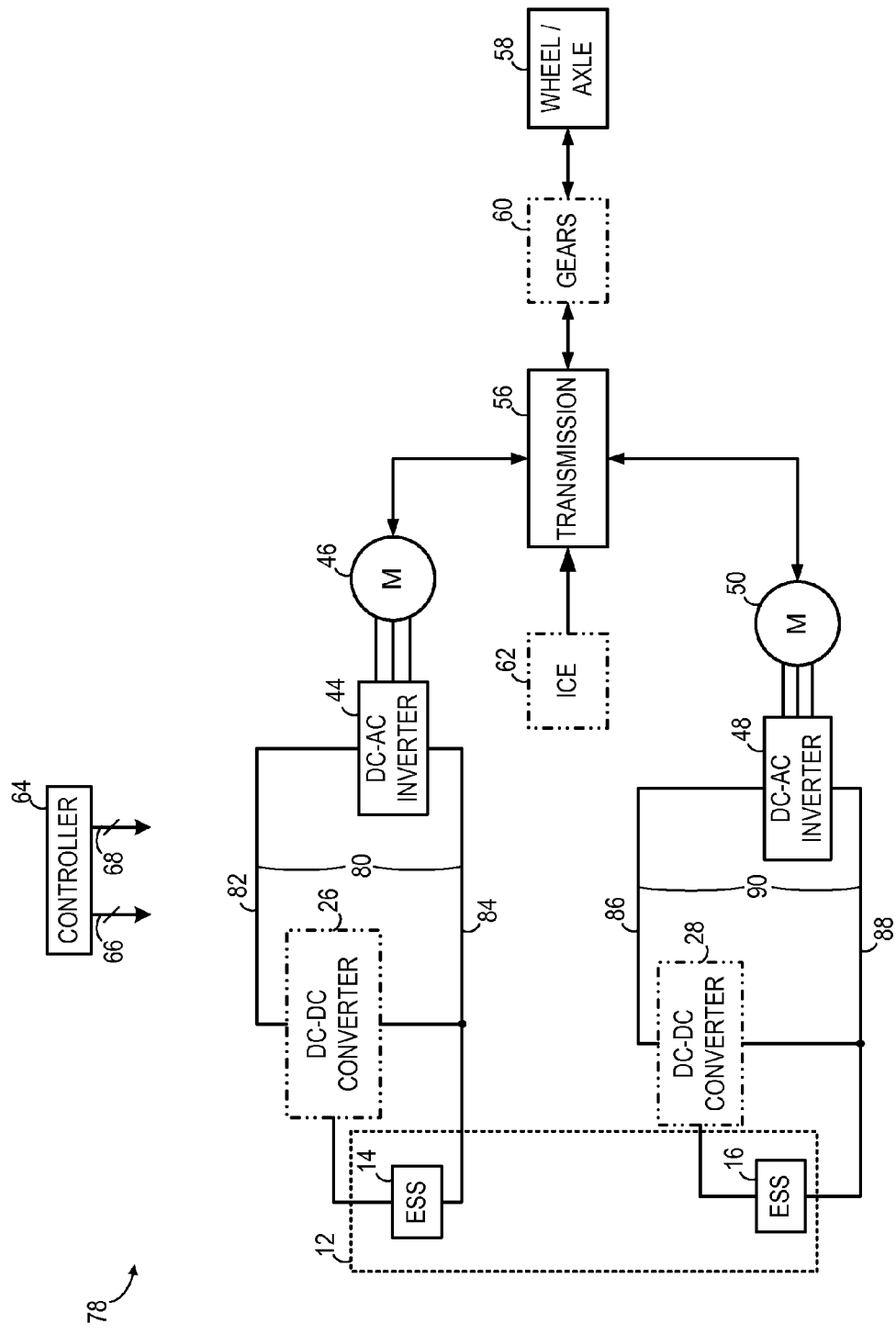
FIG. 2 is a schematic diagram of a vehicle propulsion system according to another embodiment of the invention.

Referring now to FIG. 2, a propulsion system 78 is illustrated according to an alternative embodiment. Similar to propulsion system 10, propulsion system 78 includes first and second electromechanical devices 46, 50 coupled to respective first and second DC-to-AC voltage inverters 44, 48. Other elements and components common to propulsion system 10 and propulsion system 78 are referred to herein with similar part numbering as appropriate.

As shown in FIG. 2, first DC-to-AC voltage inverter 44 is coupled to first energy storage unit 14 through a first DC bus 80 having a positive DC link 82 and a negative DC link 84. Likewise, second DC-to-AC voltage inverter 48 is coupled to second energy storage unit 16 through positive DC link 86 and negative DC link 88 of a second DC bus 90. Optionally, first and second bi-directional DC-DC converters 26, 28 (shown in phantom) may be coupled between energy storage units 14, 16 and DC-to-AC voltage inverters 44, 48 and operated via controller 64 to selectively boost the voltage of respective energy storage units 12, 16 to the bus voltage of the corresponding first or second DC bus 80, 90 during a motoring mode and buck the voltage of first or second DC bus 80, 90 to a voltage of respective energy storage unit 12, 16 during a regenerative or recharging mode.

In embodiments where either or both of the DC-DC converters 26, 28 are omitted from propulsion system 78, the overall system architecture is simplified and the weight and volume of the propulsion system 78 is reduced. However, the omission of these components from the system topology may result in lower efficiency and less flexibility of controls and optimization as a result of the loss of control of the voltage of the first and second DC buses 80, 90.

Because propulsion system 78 is configured with two independent DC busses 80, 90, the DC link voltage of each bus 80, 90 may be independently selected and controlled. In addition, the independent DC link voltages provides for greater flexibility in selecting and sizing the energy storage units 14, 16 and electromechanical devices 46, 50 for maximum system efficiency.

Figure 3:
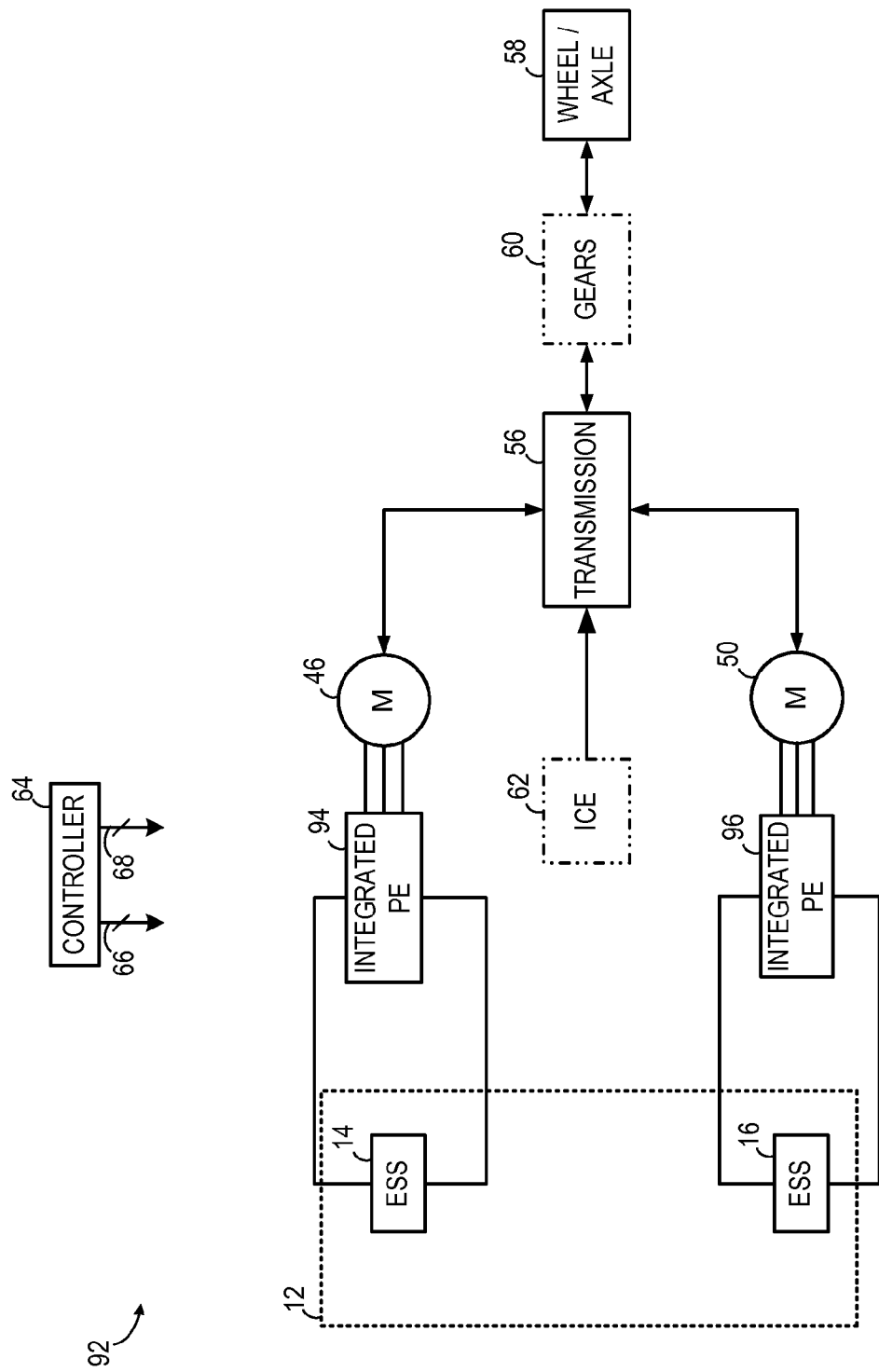
FIG. 3 is a schematic diagram of a vehicle propulsion system according to another embodiment of the invention.

FIG. 3 is a schematic diagram of a propulsion system 92 according to another embodiment of the invention. Elements and components common to propulsion systems 10, 78, and 92 are referred to relative to the same reference numbers as appropriate. Propulsion system 92 differs from propulsion systems 10, 78 in that first and second integrated power electronics assemblies 94, 96 replace the DC-DC voltage converter assemblies and DC-AC inverters of propulsion systems 10 and 78 (FIGS. 1 and 2). Each integrated power electronics assembly 94, 96 of FIG. 3 includes a DC-DC voltage converter and an DC-AC inverter combined within a common hardware packaging. Such an embodiment provides for more effective thermal management of the power electronics and a more compact design. However, repair costs for propulsion system 92 may be higher than those for propulsion systems 10, 78 because the voltage converter and inverter electronics are packaged in the same housing, the entire packaging assembly may need to be replaced when one component fails.

Figure 4:
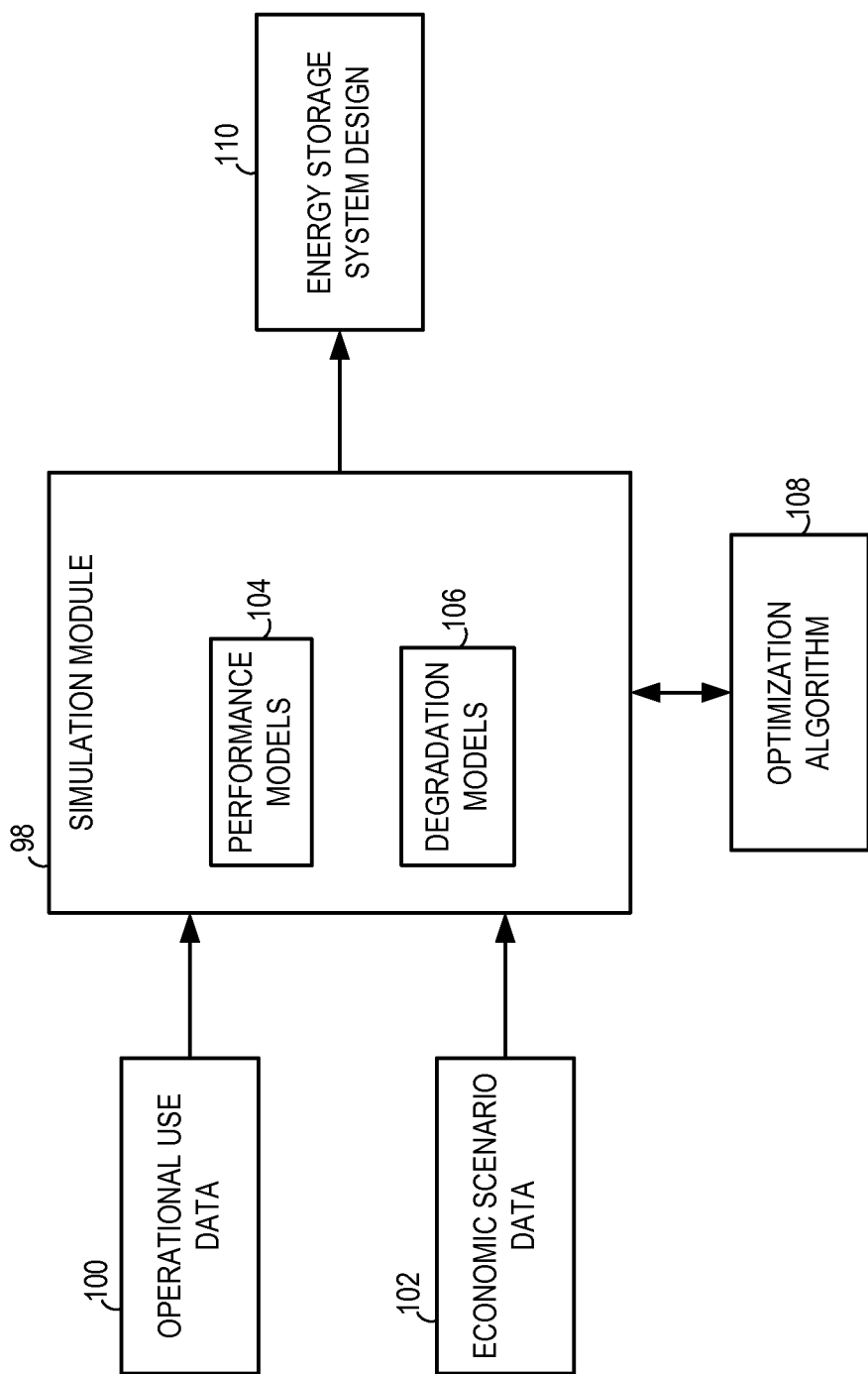
FIG. 4 is a schematic diagram of a simulation model for generating a design configuration of an energy storage system according to an embodiment of the invention.

The design configuration of the energy storage system 12 of FIGS. 1, 2, and 3 is determined using an energy storage system simulation module 98 schematically illustrated in FIG. 4. As described in detail below, simulation module 98 is operated offline and uses a collection of energy storage unit models, operational data, and economic data to define a configuration for an energy storage system that is capable of providing desired performance characteristics for propulsion system operation and that also minimizes the cost and sizing of the individual energy storage units within the energy storage system.

Simulation module 98 receives as an input operational use data 100 that includes data for a broad range of possible usage patterns for the individual energy storage units that may be included within energy storage system 12. Such operational use data 100 may include, for example, a selection of predetermined or standard duty or drive cycles, such as a city drive cycle and a highway drive cycle, which include details on how the power demand over the exemplary drive cycle varies. Simulation module 98 also receives economic scenario data 102 that includes parameters that account for variations in the initial capital costs of various types of energy storage units and vehicle operations costs including, for example, operating costs for vehicles incorporating different types of energy storage units and/or costs to recharge different types of energy storage units.

Provided within energy storage system simulation module 98 are physics-based models 104, such as, for example, electrochemical models, for various types of energy storage units that may be included within the energy storage system 12. Simulation module 98 also includes degradation models 106 of various types of energy storage units.

An optimization algorithm 108 is applied to the simulation module 98 to determine an optimized configuration for energy storage system 12, taking into account the physics-based models 104 and degradation models 106 of the various options for energy storage units, the operation use data 100, and economic scenario data 102 for the propulsion system.

The resulting output 110 of the simulation module 98 is a design for energy storage system 12 that includes a selection of the type of energy storage units within energy storage system 12, such as power batteries and/or energy batteries for example, and an optimized sizing of those energy storage units, which may include the power of each energy storage unit defined in kilowatts as well as the energy of each energy storage unit defined in kilowatt-hours. As one non-liming example, the output 110 of simulation module 98 may define an energy storage system 12 as including a 10 kW, 20 kW-hr power battery and a 10 kW, 50 kW-hr energy battery.

The energy storage system design output by simulation module 98 may be suitable for most, if not all, operational use and economic scenarios of the propulsion system. For example, a particular design could be stated to achieve 10 years of life for 85% of the customers, whereas another design option may achieve nine years of life for 95% of the customers.

Figure 5:
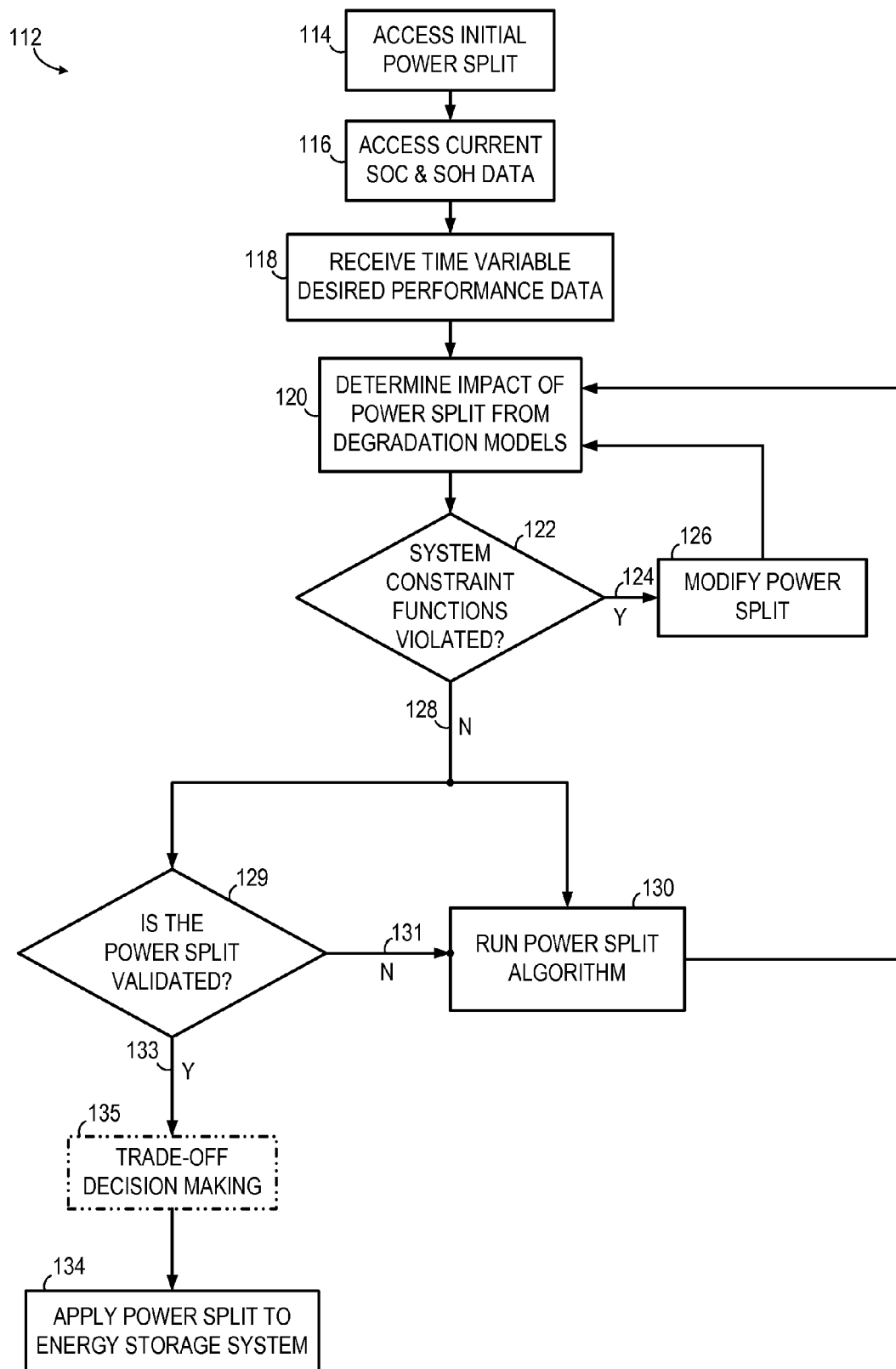
FIG. 5 illustrates a dynamic control technique for splitting a total power demand of a vehicle propulsion system between a plurality of energy storage units according to an embodiment of the invention.

In addition to providing an optimized design configuration for energy storage system 12 through the offline use of simulation module 98, embodiments of the invention also provide online optimization of energy storage system 12 through the operation of a dynamic power-split control technique 112 illustrated in FIG. 5, during which controller 64 selectively draws power from energy storage units 14, 16 according to a control strategy designed to optimize the power split among the energy storage units 14, 16 while maximizing the overall operating efficiency of propulsion system 10. The power-split control technique 112 is operated in real-time and effects a split of the total power demand for the propulsion system 10 between the energy storage units 14, 16 while considering a broad range of possible usage patterns for the energy storage units, degradation models for the energy storage units, awareness of possible future demands, and a power dispatch algorithm. While dynamic control technique 112 is described below with reference to propulsion system 10 of FIG. 1, it will be appreciated that technique 112 may readily to be extended to propulsion systems having alternative configurations, such as, for example, propulsion system 78 (FIG. 2) and propulsion system 92 (FIG. 3).

Dynamic power-split control technique 112 begins at step 114 by accessing an initial power split for the energy storage units 14, 16, which defines how the total power demand of the propulsion system 10 is to be divided between the energy storage units 14, 16 for a given operating period. At vehicle startup, the initial power split may be defined as a default value determined from a preset duty or drive cycle for propulsion system 10. In operation, the initial power split may be defined as the most recent power split applied to the energy storage units 14, 16.

At step 116, operating parameters for the first and second energy storage units 14, 16 are monitored. In one embodiment, the operating parameters include a real-time value of the state-of-charge (SOC) of the energy storage units 14, 16 and a real-time value state-of-health (SOH) of the energy storage units 14, 16. These real-time SOC and SOH values 116 may be determined from information received from energy storage unit sensor system 30. The SOC indicates a quantity or level of electrical energy stored in the energy storage units 14, 16 and may be determined by controller 64 using voltage and/or current measurements provided to controller 64 from sensor system 30. The SOH of the energy storage units 14, 16 refers to the ability of the energy storage units 14, 16 to meet rated performance during discharge (e.g., supplying a load) or during charge. The SOH may be determined from a variety of parameters. For example, where the energy storage units 14, 16 include one or more batteries, the SOH may be based on a battery terminal voltage as a function of current, an estimate of internal battery resistance, a battery temperature, a battery voltage at a given value of the SOC, and/or trends of battery resistance over the life or calendar age of a battery.

At step 118, the power-split control technique 112 receives time-variable desired vehicle performance data that reflects a real-time power demand from the propulsion system 10. Such time-variable desired vehicle performance data may be determined from a user input such as an acceleration or deceleration event, for example, or from information attained from a predetermined vehicle route or duty cycle, such as from information stored on database 74.

At step 120 the impact of operating energy storage units 14, 16 according to the power split is determined. Specifically, the time-variable desired performance data, initial power split, and real-time SOC and real-time SOH data is input to degradation models for the energy storage units 14, 16 at step 120. The degradation models 120 are used to determine a change in the state of health, $\Delta SOH$, for each energy storage unit 14, 16 as well as a change in the state of charge, $\Delta SOC$, for each energy storage unit 14, 16 based on the real-time SOC and SOH values 116 and the initial power split 114. At step 120, the degradation models are also used to determine the maximum power available from the first and second energy storage units 14, 16, which decreases over the life of the first and second energy storage units 14, 16.

At step 122, power-split control technique 112 determines whether operating the energy storage system 12 in accordance with the initial power split violates any system performance constraint functions. These system performance constraint functions may include functions that define certain thresholds for the propulsion system, such as a thermal limit, maximum power, maximum current, and/or maximum voltage, as examples.

If operation at the initial power split does violate a system performance constraint function 124, power-split control technique 112 modifies the power split between the first and second energy storage units 14, 16 at step 126 and then returns to step 120 to determine the impact of the modified power split from the degradation models. For example, if the initial power split assigned 30 percent of the total power demand to first energy storage unit 14 and the remaining 70 percent of the total power demand to second energy storage unit 16, the power split may be modified at step 126 to assign 40 percent of the total power demand to first energy storage unit 14 and the remaining 60 percent to second energy storage unit 16.

If, on the other hand, operation at the initial power split does not violate a system performance constraint function 128, power-split control technique 112 proceeds either to step 129 to determine if the power split is validated or proceeds directly to step 130 to run a power split algorithm, as described below.

In the event that the current power split was not determined as a result of running a power split algorithm, such as during a propulsion system start up where the current power split is determined from a default value, power-split control technique 112 proceeds directly from step 122 to step 130 to run a power-split algorithm that identifies an optimized power split or power allocation for the energy storage units 14, 16. In the exemplary embodiment described herein, the power-split algorithm is a multi-objective optimization algorithm that identifies an optimal vector of power split coefficients that provides an optimized tradeoff between the deterioration of the energy storage units 14, 16 and the maximization of the performance of the propulsion system 10, as described in detail below. In alternative embodiments, the power split algorithm may be a simplified filter-based algorithm, a rule-based or logic-based algorithm, or an algorithm based on one or more look-up tables.

According to various embodiments of the invention, the multi-objective optimization algorithm interfaces with the nonlinear models that define the energy storage system 12, such as, for example, models for the efficiency of the propulsion system power electronics and the overall efficiency of the power train of the propulsion system 10. The multi-objective optimization algorithm manipulates the inputs of the nonlinear models, such as time variable performance requirement, device current and voltages, switching frequency, power factors, and the like, in order to achieve the desired model and system outputs, including a desired operating efficiency, fuel economy, and maximized power output and minimized changes in the state of health (SOH) of the energy storage units 14, 16 subject to the operational constraints of the propulsion system 10.

The multi-objective optimization algorithm incorporates different methods of optimization according to various embodiments. As one non-limiting example, evolution algorithms that incorporate optimization techniques may be used to simulate natural evolutional processes. Such evolution algorithms are robust to non-smooth, non-linear, and multi-modal transfer function relationships. Alternatively, gradient-decent optimization techniques suitable for smooth and uni-modal transfer function relationships may be applied. As yet another exemplary embodiment, the optimization algorithm maybe simplified as high-low pass filter based, rule/logics based, or look-up table based to reduce computational demand and simplify real-time implementation.

In operation, the multi-objective optimization algorithm probes the various nonlinear models of the energy storage system 12 to identify a Pareto-optimal set of input-output vector tuples that satisfy the operational constraints of the energy storage system 12. Each input-output tuple corresponds to an input vector of power split ratios, and an output vector of metrics such as change in the state of health (SOH) of the energy storage units 14, 16 of the energy storage system 12, change in the state of charge (SOC) of the energy storage units 14, 16 of the energy storage system 12, and the available reserve peak performance of the energy storage units 14, 16 of the energy storage system 12. The Pareto-optimal input-output tuples reside on the Pareto or efficient frontier of solutions, and are mutually and equally good tradeoff solutions in the absence of further decision-making information.

The multi-objective optimization algorithm uses a decision-making function to perform an automated selection of a specific Pareto-optimal power-split strategy to be deployed as a reference command that defines a power split for the energy storage units 14, 16. The decision-making function is based on a heuristic model that is self adjusted or corrected and that predicts the power and energy needs of the propulsion system 10 for a predetermined number of future time steps. The multi-objective optimization algorithm superimposes the decision-making function on the Pareto-optimal set of power split strategies to filter and identify an optimal power split strategy that optimizes the vehicle system's performance and health over the future time steps.

After running the multi-objective optimization algorithm at step 130, power-split control technique 112 begins an operating loop that tests and validates the power split output by the multi-objective optimization algorithm. As illustrated in FIG. 5, the power-split control technique 112 returns to step 120 and determines the impact of the new power split from the degradation models, in a similar manner as described above with respect to the initial power split. Power-split control technique 112 then proceeds to step 122 and determines whether operating according to the new power split violates any system constraint functions.

If at step 122, power-split control technique 112 determines that the new power split does violate a system constraint function 124, the power split is modified at step 126. According to one embodiment, power-split control technique 112 may modify the power split by an incremental value, such as by decreasing the usage of one of the energy storage unit by a certain percentage and increasing the usage of the another energy storage unit to generate the remainder of the desired power output. Alternatively, power-split control technique 112 may rerun the multi-objective optimization algorithm to generate a new power split, this time applying different weights to the non-linear models.

If the new power split does not violate any system constraints 128, power-split control technique 112 proceeds to step 129 and determines whether the current power split has been validated. During this step, the change in the state-of-health, $\Delta SOH$, and change in the state-of-charge, $\Delta SOC$, resulting from the current power split are assessed to determine if the current power split will cause to great of an impact on the state-of-health and/or state-of-charge of the energy storage system. In one embodiment, the change in the state-of-health, ΔSOH, and change in the state-of-charge, ΔSOC, may be compared to respective predefined thresholds.

If either of the change in the state-of-health, ΔSOH, and the change in the state-of-charge, ΔSOC, exceeds a threshold, then the current power split has not been validated 131. In this situation, the power-split control technique 112 applies the multi-objective optimization algorithm again at step 130 and the power-split control technique 112 continues to iteratively adjust the power split running through a loop defined between steps 120, 122, 129, and 130.

If, at the end of a predetermined number of iterations, power-split control technique 112 determines that the most recent iteration of the power split derived from the multi-objective optimization algorithm does not violate the system constraint functions 128 and the power split has been validated 133, power-split control technique 112 proceeds to optional step 135 (shown in phantom) as described below.

In one embodiment, the multi-objective optimization algorithm may output multiple possible power splits at step 130 during a single iteration. For example, during a given iteration the multi-objective optimization algorithm may output a first power split stated to achieve ten years of life for 85% of the customers and a second power split stated to achieve nine years of life for 95% of the customers. Assuming each of these multiple power splits does not violate a system constraint function at step 122 and has been validated at step 129, the power-split control technique 112 determines which of these power split strategies to employ using trade-off decision making at step 135. This trade-off decision making may be an automated process based on predetermined weighting of different factors and or predetermined thresholds for those factors or be determined based on a user selection. In an alternative embodiment, the trade-off decision making may be incorporated as part of the multi-ojbective optimization algorithm at step 130.

Following the trade-off decision making of step 135, power-split control technique 112 proceeds to step 134 and outputs a power allocation of the energy storage units to the controller 64. The power allocation corresponds to the most recent iteration of the power split and indicates how the total power demand is to be divided up between the energy storage units. Controller 64 implements the power allocation via appropriate control commands to first and second bi-directional DC-DC converters 26, 28.

Power-split control technique 112 is periodically repeated during real-time operation of the propulsion system 10. According to various embodiments, the frequency with which power-split control technique 112 is used to define new power splits may be determined as a function of time, changing operating conditions of the vehicle, a changing state of the energy storage system, or a combination thereof.

Optimized operation of a propulsion system for a hybrid or electric vehicle may also be achieved by dynamically regulating the voltage of the DC bus 36. While the dynamic regulation technique is described below with respect to propulsion system 10 of FIG. 1, it is contemplated that the technique may be extended to control the DC link voltage(s) of alternative propulsion system configurations, such as, for example, propulsion system 78 (FIG. 2) or propulsion system 92 (FIG. 3). In one embodiment, the dynamic DC bus voltage regulation is carried out simultaneously with the above-described power-split control technique 112. In yet another embodiment, the dynamic DC bus voltage regulation may be carried-out independently without the above-described power split control technique 112.

Figure 6:
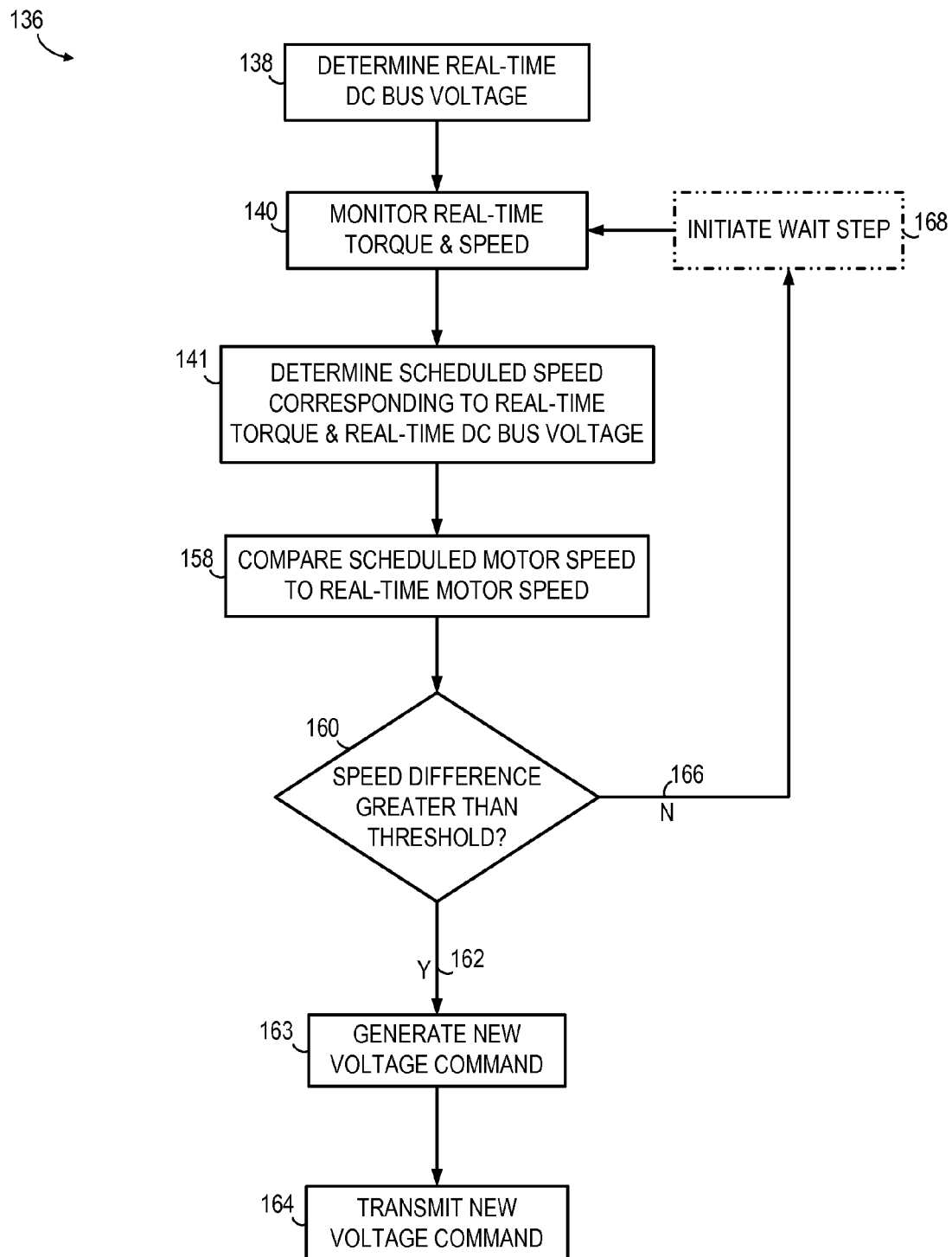
FIG. 6 illustrates a dynamic control technique for regulating a DC bus voltage a vehicle propulsion system according to an embodiment of the invention.

Referring now to FIG. 6, and with continued reference to the elements of FIG. 1 where appropriate, a dynamic voltage control technique 136 for regulating the DC bus voltage of propulsion system 10 is set forth. In addition to controlling the power split between the energy storage units 14, 16 of energy storage system 12, controller 64 also dynamically controls the DC link voltage of the DC bus 36 accordingly so that propulsion system 10 can approach its optimal efficiency during operation. As described in detail below, controller 64 monitors a DC voltage of the DC bus 36 and computes an optimal voltage command for each time step of operation and continually transmits the voltage commands to the first and second bi-directional DC-DC converters 26, 28 via control lines 66.

At step 138, the dynamic voltage control technique 136 determines the real-time voltage of the DC bus either through a measurement received from voltage sensor 38 or by accessing the previous DC bus voltage command transmitted by controller 64 to first bi-directional DC-DC converters 26, 28. This previous DC bus voltage command may be an initial voltage command transmitted upon startup of the propulsion system 10 or the voltage command transmitted during a previous time step during real-time operation of propulsion system 10.

Dynamic voltage control technique 136 accesses the real-time torque and real-time speed values of first and second electromechanical devices 46, 50 at step 140. Using the real-time torque the real-time DC bus voltage, dynamic voltage control technique 136 identifies a corresponding scheduled speed at step 141.

Figure 7:
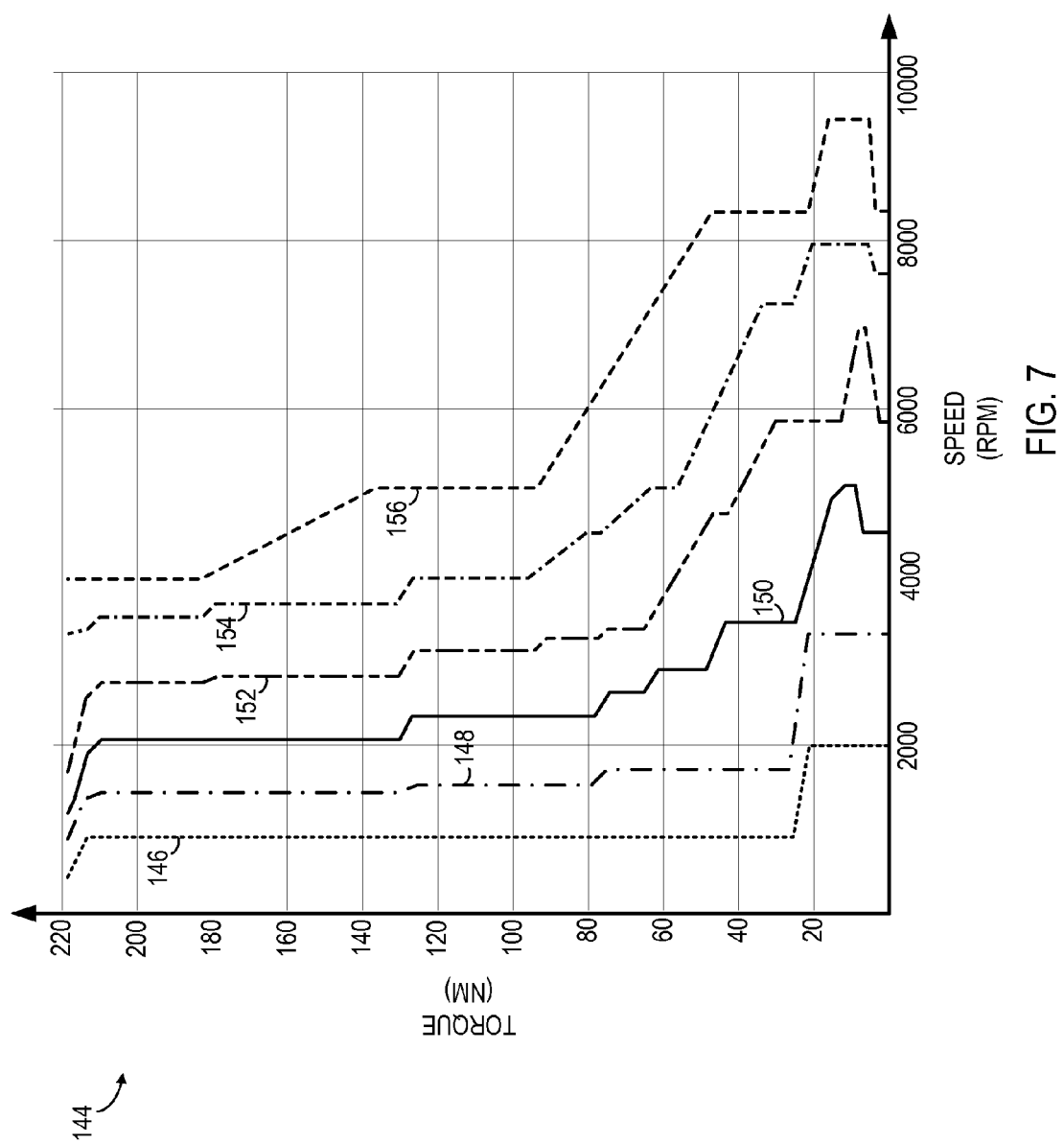
FIG. 7 is an exemplary voltage scheduling map for use with the dynamic control technique of FIG. 6.

According to one embodiment, the scheduled speed corresponding to the real-time torque and real-time DC bus voltage is determined from a voltage scheduling look-up table indexed by measured torque of the electromechanical device and DC bus voltage. In one embodiment, the voltage scheduling look-up table is generated from a voltage scheduling map, such as, for example, voltage scheduling map 144 illustrated in FIG. 7, which is a contour plot of the optimal voltage generated for a mesh grid of torque and speed of the electromechanical device. As one skilled in the art will recognize, FIG. 7 is shown for illustration purposes as a single quadrant, i.e., optimal voltage for positive torque and positive speed. However, the contour plot used for control purposes would include four quadrants, i.e., both positive and negative torque and positive and negative speed. The voltage scheduling map defines optimal DC bus voltages over a range of operating torques and operating speeds for a particular electromechanical device. As shown in FIG. 7, the voltage scheduling map 144 includes a number of operating curves 146, 148, 150, 152, 154, 156 corresponding to different DC bus voltage levels, such as, for example 250 V, 350 V, 450 V, 550 V, 650 V, and 700 V, for operating a particular electromechanical device. Given a pair of inputs of motor torque and speed, the voltage scheduling look-up table generated from the voltage scheduling map 144 may be used to identify an optimal DC voltage for the vehicle propulsion system under which the system loss is minimal. As one example, if the real-time DC bus voltage is 250 V and the real-time torque is 20 Nm, the scheduled speed would be determined to be 2000 rpm at step 141 based on the voltage scheduling map 146.

At step 158, the real-time operating speed of the electromechanical device is compared to the scheduled speed of the electromechanical device as determined at step 141. Dynamic voltage control technique 136 next determines whether the difference between the scheduled speed and the real-time operating speed of the electromechanical device is greater than a threshold at step 160. If the difference between the scheduled speed and real-time operating speed is greater than a threshold value 162, a new voltage command is generated at step 163.

At step 163, dynamic voltage control technique 136 determines the new voltage command value from a voltage scheduling look-up table generated from the voltage scheduling map 144 and based on the real-time torque and real-time speed values for the electromechanical device. Following the above-described example with a scheduled speed of 2000 RPM, torque of 20 Nm, and DC bus voltage of 250 V, if the real-time speed has increased from 1500 RPM to 2500 RPM, dynamic voltage control technique 136 will generate a new voltage command at step 163 to cause the DC bus voltage to shift up to a higher voltage level such as 350 V (corresponding to curve 148). If the real-time operating point of the electromechanical device, as determined from the real-time torque and real-time speed values, does not fall on one of the operating curves of the voltage scheduling map 144, the voltage command value may be determined by linear interpolation or by selecting the closest operating curve to the real-time operating point.

The new voltage command generated at step 163 is transmitted to the first and second bi-directional DC-DC converters 26, 28 at step 164 thereby causing the voltage on the DC bus to shift either up or down in accordance with the new voltage command. In the above-described example, the voltage on the DC bus is controlled to shift up and down by a predefined voltage interval, such as, for example, in 50 V or 100 V steps. However, alternative embodiments may generate voltage commands that shift the voltage of the DC bus in larger or smaller steps.

If, on the other hand, the difference between the scheduled speed and the real-time operating speed of the electromechanical device is not greater than the threshold value 166, dynamic voltage control technique 136 returns to step 140 after initiating an optional wait step 168 (shown in phantom).

In propulsion system embodiments that include multiple electromechanical devices, a separate voltage scheduling map is generated for each electromechanical device. In one embodiment, the voltage scheduling map is empirically derived for each electromechanical device offline. For propulsion systems having multiple electromechanical devices coupled to independent DC buses, such as the embodiments illustrated in FIGS. 2 and 3, individual voltage commands are generated in the manner described with respect to steps 138-168 of dynamic voltage control technique 136 and used to independently control the voltage on each DC bus. Alternatively, where the electromechanical devices are coupled to a common DC bus, such as the embodiment illustrated in FIG. 1, voltage commands are generated in the manner described with respect to steps 138-168 of dynamic voltage control technique 136 and then fused together into a voltage command to control the voltage on the DC bus.

In one embodiment, the individual voltage commands for each electromechanical device are combined using voting logic, which may define the fused voltage command as the median or mode of the voltages from each of the individual voltage commands. In another embodiment, the fused voltage command is determined using weighting logic that weights each of the individual voltage commands with a weighting number between 0 and 1. The weighting number for each electromechanical device is selected as an index of how much the varying voltage impacts the overall operating efficiency of the propulsion system. Weighting numbers may be determined based on one or more known operating parameters of the electromechanical device, such as maximum power, maximum efficiency, and high efficiency range. In such an embodiment, electromechanical devices with high power output, low efficiency, and narrow efficiency ranges will be given high index values or weighting numbers. Alternatively, weighting numbers may be determined dynamically based on real-time operating conditions of the electromechanical device. In this case, the weighting number for an electromechanical device would be determined specific to a particular voltage level and may vary with adjustments to the scheduled voltage of the DC bus.

Dynamic DC link voltage control technique 136 includes logic to prevent the transmission of voltage commands that would cause undesirable fluctuations in the DC bus voltage during operation thereby making dynamic control technique 136 robust to noise. To accomplish this dynamic control technique 136 implements a new voltage command only when the change in the real-time speed of the electromechanical device between consecutive iterations exceeds a predetermined threshold value.

Figure 8:
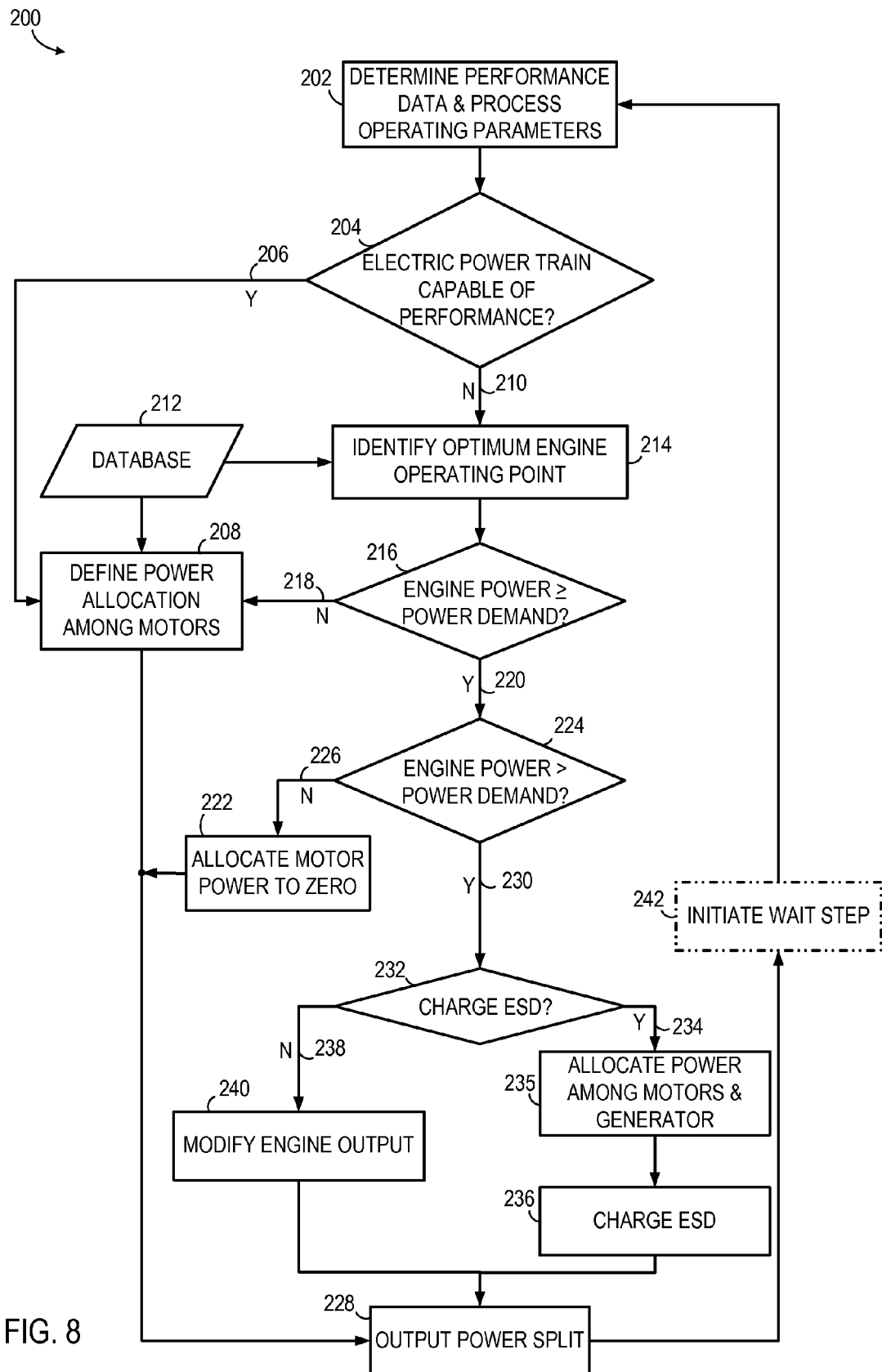
FIG. 8 illustrates a dynamic control technique for splitting a total power demand of a vehicle propulsion system between a plurality of power sources of a powertrain according to an embodiment of the invention.

Referring now to FIG. 8, a powertrain or propulsion power split technique 200 is set forth that optimizes the power split between the power generating components of the propulsion system of a hybrid electric vehicle, which operate together to deliver a desired power output to a final drive of the vehicle. Powertrain power split technique 200 may be adapted to various propulsion system configurations, including systems having an electric-only powertrain with one or more motors and hybrid systems in which the powertrain includes an internal combustion engine (ICE) and an electric powertrain having one or more motors, such as, for example, propulsion system 10 of FIG. 1 or propulsion system 246 of FIG. 9. In the embodiment described below, power split technique 200 optimizes the overall system efficiency by splitting the power demand between an ICE and the electric powertrain while meeting, maintaining, and sometimes exceeding desired performance. The desired power output is delivered to the final drive of the propulsion system (i.e., transmission 56, optional gears 60, and the wheels/axle 58). While power split technique 200 is described below with respect to propulsion system 246, one skilled in the art will recognize that the concept disclosed herein may be extended to alternative hybrid propulsion systems.

Typically ICEs have a relatively low operating efficiency as compared to electric motors. For example, the operating efficiency of an exemplary ICE may be approximately 30% or less, whereas the operating efficiency of an electric powertrain having one or more motors may be in a range of approximately 80 or 90 percent or higher. Therefore, in optimizing the energy efficiency of the propulsion system, powertrain power split technique 200 may be configured to operate with an assumption that the ICE is the least efficient power producing component within the powertrain in one embodiment of the invention. As described in detail below, in circumstances where the electric powertrain is capable of producing the current power demand for the propulsion system, power split technique 200 defines the power split such that propulsion system operates in an electric-only mode to maximize system efficiency. In situations where the electric powertrain is not capable of meeting the desired power demand, power split technique 200 defines a power split between the ICE and electric powertrain that targets operating the ICE at its most efficient operating point.

As used herein, the phrase "least efficient power source" refers to the power source within the powertrain that has the lowest operating efficiency as compared to the other power sources within the powertrain, whether the powertrain is a hybrid powertrain comprised of an ICE and one or more motor/generator units or an all-electric powertrain comprised of one or more motor/generator units. While the above-described embodiment assumes the ICE is the least efficient power producing component of a hybrid powertrain, in alternative embodiments, power split technique 200 may be configured to query one or more databases to determine the relative efficiency data for each of the power producing components of the powertrain. Based on this query, power split technique 200 may be configured to maximize the operating efficiency of the least efficient power-generating component of the power train, whether that component is an ICE or motor/generator unit, in a similar manner as described above.

Power split technique 200 begins at block 202 by determining desired vehicle performance data that reflects a real-time power from the propulsion system 246 and determining operating parameters associated with the desired vehicle performance, such as, for example, power, torque, speed, and/or acceleration. Where drive cycle information is known, such as in vehicles that follow predefined routes, this desired performance may be determined from a predefined speed versus time profile for the propulsion system, which may be used to derive operating parameters related to torque or power demand for propulsion system operation. In situations where the desired upcoming performance is not known, power split technique 200 may estimate desired performance based on previous operating history or operate in a reactionary mode by estimating desired performance based on operator pedal inputs. For example, if power split technique 200 senses that the driver is accelerating, power split technique 200 may estimate the desired torque associated with the acceleration and use the estimated torque to determine the performance data for the propulsion system 246.

At block 204 power split technique 200 determines whether the electric powertrain 247 alone, constituting motors 46, 50, is capable of producing an output that will meet the operating parameters corresponding to the desired performance or if the ICE 62 must be used to supplement the electric powertrain 247 in order to attain the desired performance. If the electric powertrain 247 is capable of producing the desired performance alone 206, power split technique 200 defines the power allocation for the ICE 62 to zero (i.e., turns the ICE 62 off), and proceeds to block 208 to define the power allocation within the electric powertrain 247, as described in more detail below.

Figure 9:
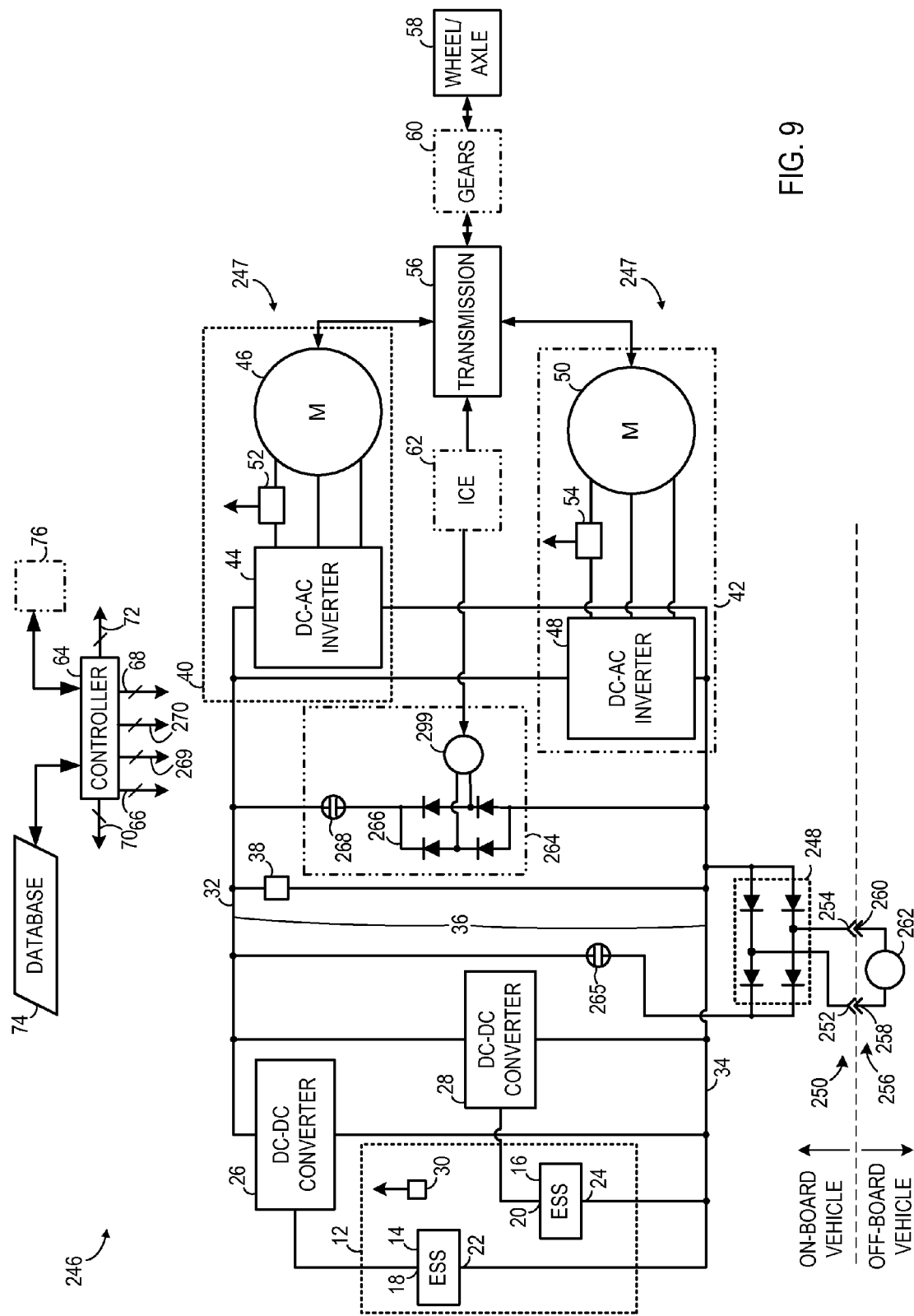
FIG. 9 is a schematic diagram of a vehicle propulsion system according to another embodiment of the invention.

On the other hand, where the electric powertrain 247 is not capable of producing the desired performance on its own 210, power split technique 200 accesses a database 212 that includes stored operating data for the particular ICE 62, such as a specific fuel consumption (SFC) map for the engine or other engine efficiency map or an efficiency curve as a function of operating conditions. In one embodiment, database 212 is part of database 74 of propulsion system 10 (FIG. 1) or propulsion system 246 (FIG. 9).

Next, power split technique 200 identifies an optimum operating point for the ICE 62 at block 214 using the engine operating data stored within database 212. This optimum operating point corresponds to a point where the ICE 62 is operating at a maximum efficiency. At block 216, power split technique 200 determines whether the actual power output of the ICE 62 when operating at the optimum operating point is greater than or equal to the desired performance for the propulsion system 246, as determined at block 202. If not 218, power split technique 200 proceeds to block 208 wherein a power allocation for the electric powertrain 247 is defined.

In an embodiment where the electric powertrain includes a single motor or electromechanical device, power split technique 200 allocates the remainder of the power output to the single motor. Where the electric powertrain includes multiple motors or electromechanical devices, such as propulsion system 246 of FIG. 9 on the other hand, power split technique 200 allocates the remainder of the power output amongst the individual motors 46, 50 to achieve an optimum overall electric powertrain efficiency that balances the performance of the individual motors.

In one embodiment, the electric powertrain power allocation is determined using an optimization algorithm that operates based on motor data stored within database 212, which may be provided as part of database 74 of propulsion system 10 (FIG. 1) in one embodiment. According to various embodiments, database 212 may include predefined efficiency contour maps for each of the motors within the electric powertrain 247 as well as data relating to other operating characteristics of the motors 46, 50, such as, for example, voltage, current, variable frequency (for an AC motor), inverter or drive efficiency.

In one embodiment, the optimization algorithm applied by power split technique 200 to determine the power split within the electric powertrain 247 is one of a filter-based algorithm, a rule-based algorithm, a weighted or logic-based algorithm, or an algorithm based on efficiency maps or one or more look-up tables that contain data that correlates power output and operating efficiency for each of the motors 46, 50, associated inverters 44, 48, or a combination thereof (i.e., overall operating efficiency of loads 40, 42). Where the algorithm operates using data within one or more look-up tables, the look-up table data is then used to identify the relative efficiencies of each of the motors 46, 50 within the electric powertrain 247 and to maximize the overall operating efficiency of the electric powertrain 247 by maximizing the operating efficiency of the least efficient motor. In embodiments where the algorithm is weighted or logic-based, the individual motors 46, 50 may be assigned weights between zero and one based on their relative efficiencies. For example, relatively lossy or inefficient motors may be assigned higher weights, whereas more efficient motors may be assigned weights closer to zero.

As one non-limiting example of a look-up table based optimization algorithm, assume the electric powertrain contains two electric motors, M1 and M2, with M1 being less efficient than M2. The optimization algorithm first determines whether the power demand from the electric powertrain exceeds the output capabilities of M2. If M2 is capable of producing the total power demand, the power output of M1 is set equal to zero and the power split for the electric powertrain is defined with M2 producing the entire power output of the electric powertrain. If M2 is not capable of producing the total power demand, on the other hand, the optimization algorithm accesses data stored within an appropriate look-up table to determine an operating point for M1 that corresponds to the most efficient operating point for M1. The power split for the electric powertrain is then defined with M1 producing a power output corresponding to the point of maximum efficiency and M2 operating to produce any remaining power output to meet the current power demand. In the event that the power output of M1 exceeds the current power demand when M1 is operating at the maximum efficiency point, the power output of M1 is scaled back to match the current power demand.

Alternatively, the optimization algorithm may be a multi-objective optimization algorithm that determines an optimal vector of operating coefficients that maximizes the overall operating efficiency of the electric powertrain. In such an embodiment, the multi-objective optimization algorithm may take into account a number of predefined functions that may include, as examples, a set of system constraints, operating costs, motor age and health data, and motor efficiency maps. In such an embodiment, Referring back to decision block 216, in the event the output power of the ICE 62 is greater than the power demand when operating at the maximum efficiency point 220, power split technique 200 performs a comparison to determine whether the power output of the ICE 62 exceeds the power demand of the propulsion system 246 at block 224. Where the ICE 62 is not producing any excess power output 226 when operating at the operating point defined at block 214, power split technique 200 sets the power allocation of the electric powertrain 247 to zero at block 222 and proceeds to output the current power split at block output power split 228, as described in more detail below.

On the other hand, if the power output of the ICE 62 does exceed the power demand of the propulsion system 230, power split technique 200 determines whether to use the excess output of the ICE 62 to charge one or more of the energy storage devices 14, 16 provided within the energy storage system 12 at block 232. According to one embodiment, power split technique 200 determines whether to charge the energy storage system 12 based on a current SOC and, optionally, a current SOH of the energy storage device(s) 14, 16 within the energy storage system 12. The SOH and SOC may be determined in a similar manner as described with respect to step 116 of power-split control technique 112 (FIG. 5). Using the SOC and SOH, power split technique 200 then accesses degradation models stored within database 212 for each energy storage device(s) 14, 16 of the energy storage system 12. If power split technique 200 determines that the energy storage system 12 is in need of a charge and applying such a charge would not violate a system constraint 234, power split technique 200 allocates excess engine power among the motors (negative or zero values) and generator at block 235 and uses the excess engine power to charge the energy storage system 12 at block 236. In such a situation, a first subportion of the power output of the ICE 62 corresponding to the desired power demand is supplied to the final drive components (e.g., transmission 56, gears 60 and wheels/axle 58) of the propulsion system 246 and a second subportion of the power output of the ICE 62 or the excess engine power is supplied to energy storage system 12.

The excess power generated by ICE 62 may be provided to energy storage system 12 through a contactor or switching device 268 coupled to the DC bus 36. Controller 64 may be programmed to close contactor 368 to charge at least one of energy storage unit 14 and energy storage unit 16 where power split technique 200 determines that the energy storage system 12 is in need of a charge and applying such a charge would not violate a system constraint 234. In one embodiment, the excess power output of ICE 62 may be allocated to one or both of energy storage units 14, 16 in accordance with the reverse power split technique described with respect to FIG. 10.

If, on the other hand, power split technique 200 determines either that the energy storage system 12 does not need a charge or that charging the energy storage system 12 using the available excess power output from the ICE 62 would violate a system constraint 238, power split technique 200 modifies the operating point of the ICE 62 at block 240 such that the ICE 62 produces an output corresponding to the current power demand.

At block 228, power split technique 200 outputs a power split as determined by block 208, block 222, or block 240 to controller 64 of the propulsion system 246, which applies appropriate controls to the ICE 62 and/or motor(s) 46, 50 of the propulsion system 246. Following an optional wait step, shown in phantom at block 242, power split technique 200 returns to block 202 to begin a new iteration of the performance data and power split determination for the hybrid powertrain.

While power split technique 200 is described above with respect to the propulsion system of a hybrid electric vehicle, it is contemplated that portions of technique 200, including the power allocation decisions made at block 208, may be used in the context of an all electric vehicle.

Figure 10:
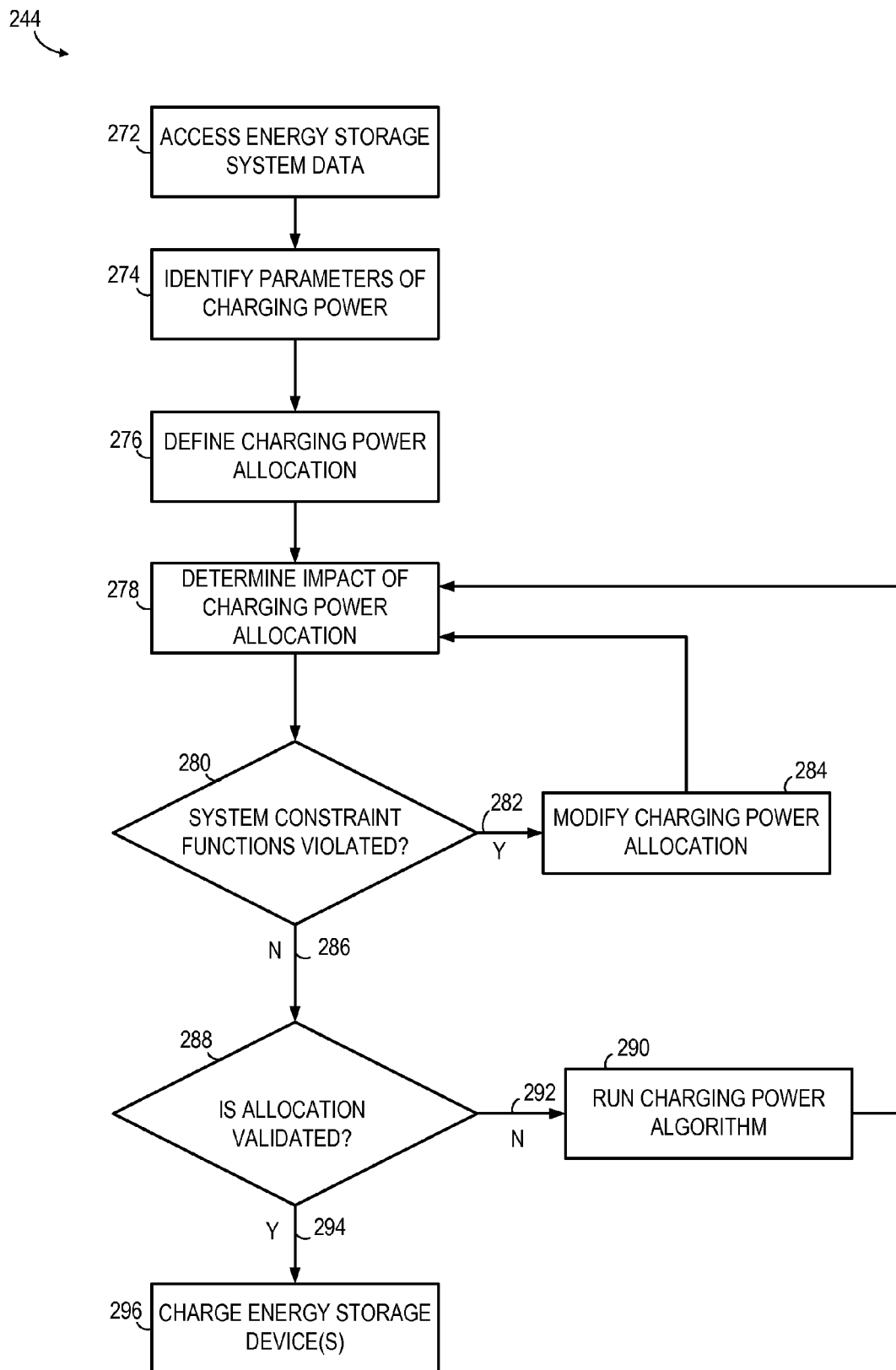
FIG. 10 illustrates a dynamic control technique for recharging one or more energy storage units using available charging power according to an embodiment of the invention.

Referring now to FIGS. 9 and 10, a reverse power split technique 244 is disclosed that is useable to recharge one or more energy storage units within an energy storage system, such as energy storage system 12 of a propulsion system 246. Similar to propulsion system 10 of FIG. 1, propulsion system 246 includes an energy storage system 12 having energy storage units 14 or 16. Other elements and components common to propulsion system 10 and propulsion system 246 are referred to herein with similar part numbering as appropriate.

As shown in FIG. 9, propulsion system 246 includes a rectifier 248 coupled to a receptacle 250 having contacts 252, 254 configured to mate with a plug or connector 256 having contacts 258, 260 of a external power source 262. In the embodiment shown, rectifier 248 is coupled to DC-DC converters 26, 28, however, one skilled in the art will recognize that rectifier 248 could be positioned in alternative locations of propulsion system 246 to provide charging power to energy storage system 12. While rectifier 248 is illustrated in FIG. 9 as being mounted on-board propulsion system 246, one skilled in the art will recognize that rectifier 248 may be mounted off-board propulsion system 246 and integrated within external power source 262 in an alternative embodiment. As an alternative to the plug-in charging configuration shown in FIG. 9, energy storage system 12 of propulsion system 246 may be configured to accept charge wirelessly via an inductive charger.

In one embodiment, it is contemplated that external power source 262 is an AC source and that one, two, or three phases of external power source 262 may be used to provide 120 V or 240 V of AC power. In a configuration designed for operation from a three phase AC external power source 262, rectifier 248 may be modified to include two additional diodes (not shown) for the third phase of a three-phase rectifier. In an alternative embodiment where external power source 262 is a DC source, rectifier 248 helps to ensure that the charging voltage transferred to DC bus 36 has the correct polarity.

As shown in FIG. 9, a contactor or switching device 265 is provided to selectively couple the output of rectifier 248 to DC bus 36. Controller 64 is coupled to contactor 265 via control lines 269 and is programmed to operate contactor 265 in an open position, wherein the power output of external power source 262 is decoupled from DC bus 36 and a closed position, wherein the power output of external power source 262 is coupled to DC bus 36.

In hybrid embodiments where propulsion system 246 includes optional ICE 62, an optional charging assembly 264 (shown in phantom) including an alternator 299 or generator, a rectifier 266, and a contactor 268 or switch are coupled to the DC bus 36 as shown in FIG. 9. According to various embodiments, contactor 268 may be constructed as an electromechanical switching device or a solid-state type switching device. Controller 64 is electrically coupled to contactor 268 via control lines 270 and configured to selectively operate contactor 268 in an open position, wherein an output of ICE 62 is decoupled from DC bus 36 and a closed position, wherein an output of ICE 62 is coupled to DC bus 36. It is contemplated that one or more additional contactors may be provided within propulsion system 246 controlled by controller 64 to selectively transfer charging power from external power source 262, ICE 62, or motors 48, 50 via regenerative braking to one or both of energy storage units 18, 20.

Referring now to FIG. 10, and with continued reference to the elements of propulsion system 246 of FIG. 9 where appropriate, the details of a charging power split technique or reverse power split technique 244 will be described. While reverse power split technique 244 is described herein with respect to the elements of propulsion system 246, it is contemplated that reverse power split technique 244 may be adapted for alternative propulsion system configurations, including electric only systems having one or more energy storage units, hybrid systems including an internal combustion engine (ICE) and a single energy storage unit or two or more energy storage units, as well as the propulsion system configurations illustrated in FIGS. 1-3.

Reverse power split technique 244 begins at block 272 by accessing data for the energy storage system 12. This data may include identifying information for energy storage units 14, 16 such as battery type, for example, as well as a real-time state of charge (SOC) and real-time state of health (SOH) data of energy storage units 14, 16. SOC and SOH data may be determined from information received from energy storage unit sensor system 30 at periodic intervals during operation of propulsion system 10. As non-limiting examples, the SOH data may represent a battery terminal voltage as a function of current, an estimate of internal battery resistance, an estimate of battery capacity (Ah), a battery temperature, a battery voltage at a given value of the SOC, and/or trends of battery resistance over the life or calendar age of a battery.

The parameters of the charging power are identified at block 274. Namely, reverse power split technique 244 detects the presence of excess power that is available to charge energy storage system 12 and determines the characteristics of that excess power. This excess power may be available where propulsion system 246 is operating in any of the following modes: a regenerative braking mode, a motoring mode where the ICE 62 is producing excess power usable to charge the energy storage system 12, and a charging mode where the vehicle is coupled to external power source 262. In any of these operating modes, reverse power split technique 244 is configured to assess the parameters of the excess power currently available for charging from the given charging source, which may be the ICE 62, one or more of electromechanical devices 46, 50, or an external or off-board power source 262 depending on the given operating mode.

Where propulsion system 246 is coupled to external power source 262, for example, reverse power split technique 244 determines the parameters of the charging power available from the external power source 262, such as, for example, the power and energy (kW, kWh) that external power source 262 is capable of supplying. In various embodiments, receptacle 250 and/or connector 256 may be configured to send signals to controller 64 indicative of the charging parameters of external power source 262. In any of these operating scenarios, reverse power split technique 244 may be configured to access stored operational use data and/or known duty cycles to estimate a duration that the excess charging power will be available.

After the parameters of the charging power are identified at block 274, reverse power split technique 244 defines an initial charging power allocation at block 276. This charging power allocation apportions a given percentage of the available charging power to each of the energy storage units 14, 16 within the energy storage system 12. Depending on the determined parameters of the available charging power and the characteristics of energy storage units 14, 16, the percentage of charging power allocated to each of the energy storage units 14, 16 may be anywhere in the range of 0 to 100% of the total available charging power. As one example, this initial charging power allocation may evenly split the available charging power between energy storage units 14, 16 as an initial default allocation. As another example, where energy storage unit 14 is a power battery and energy storage unit 16 is an energy battery, the default initial charging allocation may supply all of the available charging power to the power battery in situations where the charging power will only be available for a short duration, such as during a regenerative braking mode for example, since the power battery is able to accept charge at a faster rate than the energy battery.

At block 278 the impact of the initial charging power allocation on energy storage units 14, 16 is determined by inputting the initial charging power allocation, real-time SOC data, and real-time SOH data into degradation models specific to each of the energy storage units 14, 16. Since energy storage units respond differently when charging and discharging, the degradation models used at block 278 differ from the degradation models 106 described with respect to FIG. 4. According to various embodiments, these charge-specific degradation models may take into account any combination of the following information for energy storage units 14, 16: charge cell or battery voltage, charge C-rate, an internal resistance (rise) model, a capacity (loss) model as a function of temperature, current, voltage, and/or a cumulative number of charge cycles. The charge-specific degradation models are used at block 278 to determine a change in the state of health, $\Delta SOH$, and the resulting change in the state of charge, $\Delta SOC$, for each energy storage unit 14, 16 being charged in accordance with the initial charging power allocation.

At block 280, reverse power split technique 244 uses the output of block 278 to determine whether charging energy storage system 12 violates any energy storage system constraints when being charged in accordance with the initial charging power allocation. These energy storage system constraints may include functions that define certain thresholds for the energy storage system, such as a thermal limit, maximum power, maximum current, and/or maximum voltage of energy storage units 14, 16, as examples.

If charging in accordance with the initial charging power allocation violates an energy storage system constraint 282, reverse power split technique 244 modifies the charging power allocation at block 284 and then returns to block 278 to determine the impact of the modified charging power allocation on energy storage units 14, 16 from the degradation models. In one embodiment, the modification may comprise adjusting the charging power allocation by a predefined step value, such as, for example, five or ten percent.

If charging the energy storage system 12 in accordance with the initial charging power allocation does not violate an energy storage system constraint 286, reverse power split technique 244 proceeds to block 288 to determine whether the charging power allocation has been validated. Reverse power split technique 244 validates the charging power allocation by running a charging power algorithm at block 290. Thus, the first step in determining if the allocation is validated at block 280 is to check if a charging power algorithm has been applied to the current charging power allocation.

If the charging power algorithm has not been applied to the current charging power allocation, reverse power split technique 244 determines that the allocation has not been validated 292 and proceeds to block 290 to run the charging power algorithm. The charging power algorithm is configured to identify an optimal vector of charging power split coefficients that distributes the available charging power in a manner that optimizes the resulting SOC of the energy storage units 14, 16 following the charging event while minimizing the deterioration of the SOH as a result of the charge. In one embodiment, the charging power algorithm is a multi-objective optimization algorithm, similar to the power-split algorithm described with respect to the dynamic power-split control technique 112 of FIG. 5, which identifies an optimized split of the available charging power to the energy storage units 14, 16 of the energy storage system 12. In alternative embodiments, the charging power algorithm may be a simplified filter-based algorithm, a rule-based algorithm, a logic-based algorithm, or an algorithm operable based on one or more look-up tables.

Where the charging power algorithm is a multi-objective optimization algorithm, the charging power algorithm interfaces with the nonlinear models that define the energy storage system 12, including, for example, models of the efficiencies of the DC-DC converters 26, 28 coupled to the respective energy storage units 14, 16, other power electronic devices provided within propulsion system 10 (e.g., DC-AC inverters 44,48), dynamic thermal and/or mechanical models for the energy storage units 14, 16, as well as energy storage degradation models for charging energy storage units 14, 16. The multi-objective optimzation algorithm may also take into account an expected usage of the energy storage units 14, 16 based on predetermined drive cycles or past usage history stored on database 74. The multi-objective charging power algorithm manipulates the inputs of the nonlinear models, such as the operating current and voltages of power electronic devices, switching frequency, power factors, and the like, in order to achieve an optimized increase in the SOC of the energy storage units 14, 16 with a minimal change in the state of health (SOH) of the energy storage units 14, 16 subject to the operational constraints of the propulsion system 10. The multi-objective charging power algorithm may also be configured to define an optimized charging allocation that prioritizes charing of one of energy storage units 14, 16 based on the expected upcoming usage of the propulsion system 246.

The multi-objective charging power algorithm incorporates different methods of optimization according to various embodiments. As one non-limiting example, evolution algorithms that incorporate optimization techniques may be used to simulate natural evolutional processes. Such evolution algorithms are robust to non-smooth, non-linear, and multi-modal transfer function relationships. Alternatively, gradient-decent optimization techniques suitable for smooth and uni-modal transfer function relationships may be applied. As yet another exemplary embodiment, the optimization algorithm maybe simplified as high-low pass filter based, rule/logics based, or look-up table based to reduce computational demand and simplify real-time implementation.

In operation, the multi-objective charging power algorithm probes the various nonlinear models of the energy storage system 12 to identify a Pareto-optimal set of input-output vector tuples that satisfy the operational constraints of the energy storage system 12. Each input-output tuple corresponds to an input vector of charging power split ratios, and an output vector of metrics such as change in the state of health (SOH) of the energy storage units 14, 16 of the energy storage system 12, change in the state of charge (SOC) of the energy storage units 14, 16 of the energy storage system 12. The Pareto-optimal input-output tuples reside on the Pareto or efficient frontier of solutions, and are mutually and equally good tradeoff solutions in the absence of further decision-making information.

The multi-objective charging power algorithm uses a decision-making function to perform an automated selection of a specific Pareto-optimal charging power split strategy to be deployed as a reference command that defines a charging power split for the energy storage units 14, 16. The decision-making function is based on a heuristic model that is self adjusted or corrected and that predicts the charging power available from the propulsion system 10 for a predetermined number of future time steps. The multi-objective optimization algorithm superimposes the decision-making function on the Pareto-optimal set of charging power split strategies to filter and identify an optimal charging power split strategy that optimizes the performance and health of the energy storage system 12 over the future time steps.

The charging power algorithm outputs a modified charging power allocation to block 278 where the impact of the modified charging power allocation is determined. Reverse power split technique 244 continues to iteratively adjust the charging power allocation through blocks 280, 284, 288, 290 in the manner described above until, reverse power split technique 244 determines that the current charge split allocation has been validated 294 following block 288. At this point, reverse power split technique 244 proceeds to charge one or more energy storage units 14, 16 of the energy storage system 12 in accordance with the current charge split allocation at block 296.

As described above, embodiments of the invention utilize offline and online optimization techniques for designing and operating vehicle propulsion systems for electric vehicles and hybrid electric vehicles. The offline optimization technique determines a design configuration for an energy storage system of a vehicle propulsion system that minimizes size of the energy storage units within the energy storage system while providing a design configuration that achieves desired system constraints, such as maximum power output and desired years of life. To further maximize the life span of the energy storage units provided within a given energy storage system, an online optimization technique is described herein that adjusts a power split between the energy storage units during operation of the vehicle propulsion system to achieve a total power demand of the propulsion system while monitoring the state of charge and state of health of the energy storage units. Embodiments of the invention also utilize an online voltage regulation technique that dynamically controls the voltage of the DC bus based on the speed of the electromechanical devices and a predetermined voltage scheduling map specific to each electromechanical device.

Embodiments of the invention also optimize power generation from the propulsion system using an optimization technique that determines an optimal power split between the power sources provided within the propulsion system. This optimization technique aims to operate the least efficient power source at its highest operating efficiency and uses one or more additional power sources to generate any additional power demand as needed. Where the least efficient power source is producing more power output than the current power demand, any excess power generated may be used to recharge one or more energy storage units provided within the propulsion system.

Embodiments of the invention further utilize an optimization technique for recharging an energy storage system using charging power generated by regenerative braking, an ICE, or an external power source. This optimization technique maximizes the life span of the individual energy storage units of the energy storage system while also maximizing the state of charge of the energy storage units using degradation models that assess the impact of recharging each of the energy storage units with the currently available excess power.

As described above, these online and offline techniques improve the overall system performance and efficiency while optimizing the lifespan of the energy storage units and reducing the overall manufacturing cost of the vehicle propulsion system.

One skilled in the art will appreciate that controller 64 may be implemented via a plurality of components such as one or more of electronic components, hardware components, and/or computer software components. These components may include one or more tangible computer readable storage media that generally stores instructions such as software, firmware and/or assembly language for performing one or more portions of one or more implementations or embodiments. Examples of a tangible computer readable storage medium include a recordable data storage medium and/or mass storage device. Such tangible computer readable storage medium may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of tangible computer readable storage media not listed may be employed with embodiments of the invention.

A number of such components can be combined or divided in an implementation of the systems described herein. Further, such components may include a set and/or series of computer instructions written in or implemented with any of a number of programming languages, as will be appreciated by those skilled in the art.

A technical contribution for the disclosed apparatus is that it provides for a controller implemented technique for controlling one or more power sources to produce a desired power demand for a vehicle propulsion system.

According to one embodiment of the invention, a vehicle propulsion system includes a plurality of power sources coupled to a final drive of the vehicle propulsion system. A controller is programmed to determine a desired power demand from the plurality of power sources and operate a number of the plurality of power sources to produce the desired power demand. Operating the number of the plurality of power sources includes identifying a least efficient power source of the plurality of power sources, controlling the least efficient power source to produce power at an optimum operating point of the least efficient power source, and identifying a power output of the least efficient power source corresponding to the optimum operating point. Operating the number of the plurality of power sources further includes comparing the power output of the least efficient power source to the desired power demand, identifying a remaining power demand from the comparison, and controlling another power source of the plurality of power sources to produce the remaining power demand.

In accordance with another embodiment of the invention, a method of powering a propulsion system of a hybrid electric vehicle includes the steps of determining a power demand of the hybrid electric vehicle, identifying operating efficiencies of a plurality of power sources coupled to a final drive of the hybrid electric vehicle, and identifying a least efficient power source of the plurality of power sources. The method also includes controlling the least efficient power source to operate at a maximum operating efficiency of the least efficient power source, determining a power output of the least efficient power source when operating at the maximum operating efficiency, comparing the power output of the least efficient power source to the total power demand, and controlling another power source of the plurality of power sources to output power to the final drive if the power output of the least efficient power source is less than the total power demand.

In accordance with yet another embodiment of the invention, a control system for a vehicle propulsion system comprising an internal combustion engine (ICE) and an electric powertrain is disclosed. The control system includes a controller programmed to determine a desired power demand from the vehicle propulsion system, identify an ICE power output corresponding to an optimum operating point of the ICE, and compare the ICE power output to the desired power demand. If the ICE power output exceeds the desired power demand, the controller supplies a first subportion of the ICE power output to a final drive of the vehicle propulsion system and supplies a second subportion of the ICE power output to at least one energy storage unit of the electric powertrain to recharge the at least one energy storage unit. If the ICE power output does not exceed the desired power demand, the controller supplies the ICE power output to the final drive.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vehicle propulsion system comprising:
at least three power sources coupled to a final drive of the vehicle propulsion system; and
a controller configured with a database comprising an efficiency contour map for each power source, the controller programmed to:
determine a power demand sufficient to operate the final drive; and
operate the power sources to produce the power demand, wherein operating the power sources comprises:
identifying a least efficient power source of the power sources;

controlling the least efficient power source to produce power at an operating point relative to the point of maximum efficiency on the efficiency contour map of the least efficient power source;
identifying a power output of the least efficient power source corresponding to the operating point;
comparing the power output of the least efficient power source to the power demand;
identifying a remaining power demand from the comparison; and
controlling at least two remaining power sources of the power sources to produce the remaining power demand by selectively allocating production of power such that at least one remaining power source produces power at an operating point relative to the point of maximum efficiency on the efficiency contour map of the remaining power source.

2. The vehicle propulsion system of claim 1 further comprising:
an internal combustion engine (ICE); and
an electric powertrain comprising:
a DC bus;
at least two electromechanical devices coupled to the DC bus; and
at least one energy storage unit coupled to the DC bus.

3. The vehicle propulsion system of claim 2 wherein the ICE comprises the least efficient power source.

4. The vehicle propulsion system of claim 2 further comprising a contactor positioned to selectively couple an output of the ICE to the DC bus via an alternator.

5. The vehicle propulsion system of claim 4 wherein the controller is further programmed to:
identify an excess power output of the ICE from the comparison; and
close the contactor to charge the energy storage unit using the excess power output.

6. The vehicle propulsion system of claim 5 wherein the controller is further programmed to:
identify parameters of the excess power output;
access a charging degradation model for the energy storage unit; and
iteratively define a charging power allocation to charge the energy storage unit based on the identified parameters and the charging degradation model.

7. A method of powering a propulsion system of a hybrid electric vehicle, the method comprising:
determining a power demand sufficient to operate a final drive of the hybrid electric vehicle;
operating at least three power sources coupled to the final drive to produce the power demand, wherein operating the power sources comprises:
identifying a least efficient power source of the power sources;
controlling the least efficient power source to operate relative to a maximum operating efficiency of the least efficient power source based on an efficiency contour map of the least efficient power source stored in a database;
determining a power output of the least efficient power source when operating relative to the maximum operating efficiency;
comparing the power output of the least efficient power source to the power demand;
identifying a remaining power demand from the comparison; and
controlling at least two remaining power sources of the power sources to produce the remaining power demand by selectively allocating production of power such that the at least one remaining power source produces power at an operating point relative to the point of maximum efficiency on an efficiency contour map of the remaining power source stored in the database.

8. The method of claim 7 further comprising;
identifying an excess power output from the comparison; and
charging an energy storage unit of the propulsion system with the excess power output of the least efficient power source.

9. The method of claim 7 further comprising:
identifying an excess power output from the comparison;
querying a state of charge (SOC) of a plurality of energy storage units of the propulsion system;
defining a charging power split between the energy storage units based on the SOC; and
charging at least one of the energy storage units according to the charging power split.

10. The method of claim 9 further comprising defining the charging power split based on charging degradation models for the energy storage units.

11. The method of claim 9 further comprising iteratively defining the charging power split using a multi-objective optimization algorithm.

12. The method of claim 7 further comprising:
controlling an internal combustion engine (ICE) to operate relative to a maximum operating efficiency of the ICE and produce a first portion of the power demand;
controlling a first motor to operate relative to a maximum operating efficiency of the first motor and produce a second portion of the power demand; and
controlling a second motor to produce a remaining portion of the power demand.

13. A control system for a vehicle propulsion system comprising an internal combustion engine (ICE) and an electric powertrain, the electric powertrain comprising at least one energy storage unit and at least two electric motors, the control system comprising a controller configured with a database comprising efficiency contour maps for the ICE and both electric motors, the controller programmed to:
determine a power demand sufficient to operate a final drive of the vehicle propulsion system;
identify an ICE power output corresponding to an operating point relative to the point of maximum efficiency on the efficiency contour map of the ICE;
compare the ICE power output to the power demand; and
if the ICE power output exceeds the power demand, supply a first subportion of the ICE power output to the final drive and supply a second subportion of the ICE power output to the energy storage unit to charge the energy storage unit; and
if the ICE power output does not exceed the power demand, supply the ICE power output to the final drive and supply a remaining power from the electric motors by selectively allocating production of power such that at least one electric motor produces power at an operating point relative to the point of maximum efficiency on the efficiency contour map of the electric motor.

14. The control system of claim 13 wherein the controller is further programmed to iteratively define a charging power allocation for the energy storage unit.

15. The control system of claim 14 wherein the controller is further programmed to:
- determine a current state of charge (SOC) of the energy storage unit;
- access a charging power degradation model for the energy storage unit; and
- define the charging power allocation based on the determined current (SOC) and the charging power degradation model.

16. The control system of claim 13 wherein the controller is further programmed to supply the remaining power using a multi-objective optimization algorithm.

17. The control system of claim 16 wherein the multi-objective optimization algorithm determines an optimal vector of operating coefficients that maximizes an overall operating efficiency of the electric powertrain.

18. The vehicle propulsion system of claim 2 wherein the electromechanical devices comprise the remaining power sources.

* * * * *